(12) United States Patent  
Bourhill et al.

(10) Patent No.: US 8,646,582 B2  
(45) Date of Patent: Feb. 11, 2014

(54) VERTICAL RETRACTABLE RAIL CLAMP

(75) Inventors: Ian W. Bourhill, Delta (CA); Igor Berliant, Delta (CA)

(73) Assignee: Hillmar Industries Limited, Delta (CA)

( * ) Notice: Subject to any disclaimer, the term of this patent is extended or adjusted under 35 U.S.C. 154(b) by 25 days.

(21) Appl. No.: 13/512,871

(22) PCT Filed: Nov. 30, 2009

(86) PCT No.: PCT/CA2009/001737  
§ 371 (c)(1),  
(2), (4) Date: May 30, 2012

(87) PCT Pub. No.: WO2011/063491  
PCT Pub. Date: Jun. 3, 2011

(65) Prior Publication Data  
US 2012/0241262 A1      Sep. 27, 2012

(51) Int. Cl.  
*B61H 7/12*      (2006.01)

(52) U.S. Cl.  
USPC ................................. 188/43; 188/41; 188/33

(58) Field of Classification Search  
USPC ................... 188/33, 34, 41, 42, 43, 44, 165; 104/249, 257, 258, 261, 7.2  
See application file for complete search history.

(56) References Cited

U.S. PATENT DOCUMENTS

| | | | | |
|---|---|---|---|---|
| 2,748,895 A * | 6/1956 | Lucchetti | | 188/36 |
| 2,928,502 A * | 3/1960 | Troften | | 188/43 |
| 3,972,392 A | 8/1976 | Johnson | | |
| 4,236,608 A * | 12/1980 | Kobelt | | 188/43 |
| 4,308,937 A * | 1/1982 | Johnson | | 188/43 |
| 5,014,828 A * | 5/1991 | Baldassarre | | 188/173 |
| 7,975,811 B2 * | 7/2011 | Berliant | | 188/43 |

* cited by examiner

*Primary Examiner* — Thomas Irvin  
(74) *Attorney, Agent, or Firm* — Cameron IP

(57) ABSTRACT

The rail clamp includes a carriage having an actuator frame mounted to its base so as to extend upwardly from the base. Springs are mounted in the actuator frame at the upper end of the carriage. An actuator is mounted between the base and the springs. A wheel is mounted on a wheel support. The wheel engages the rail. At least one suspension frame is pivotally mounted to the carriage and at an opposite end, to the wheel support. The actuator operates on the suspension frame so as to elevate the carriage. A pair of clamping levers is pivotally mounted to the base of the carriage. Brake shoes mount on the lower-most ends of the levers. The levers are pivotable so as to clamp their lower-most ends together when their upper ends are moved apart.

20 Claims, 21 Drawing Sheets

Fig 3

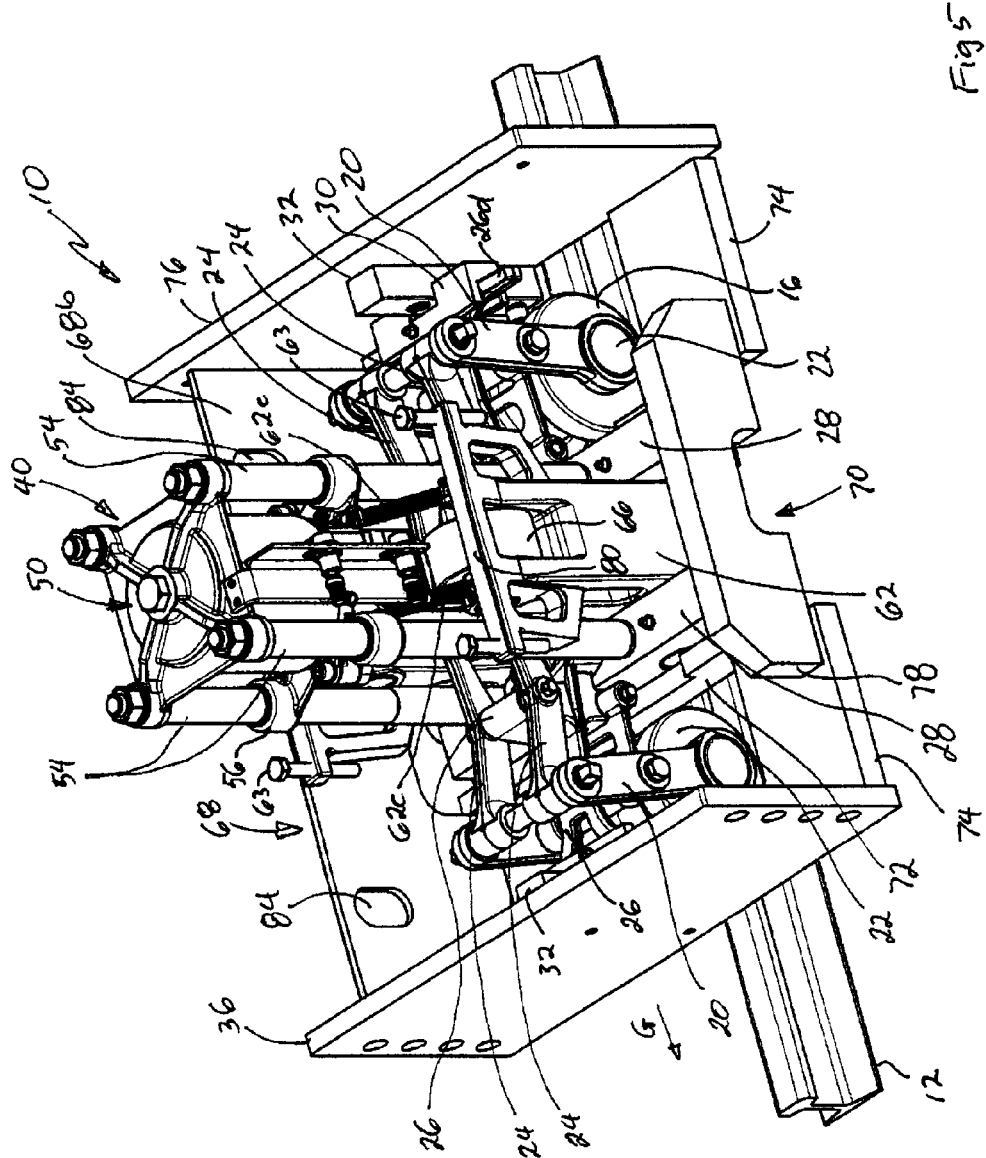

VERTICAL RETRACTABLE RAIL CLAMP

FIELD OF THE INVENTION

This invention relates to spring-set clamps and brakes employing clamping devices that clamp the opposite sides of a clamped member such as a rail.

BACKGROUND OF THE INVENTION

In the prior art of which applicants are aware, U.S. Pat. No. 3,972,392 to Johnson which issued Aug. 3, 1976, discloses clamping the sides of crane rails in a fail-safe mode of operation such that an unpowered or unattended crane is secured to its rails whereby to resist external forces tending to move the crane along the rails. Johnson teaches that a fail-safe clamping apparatus adapted to clamp the sides of crane rails must satisfy several requirements: first, it must be independently powered by fail-safe means such that it is actuated when the crane is unpowered or unattended; second, the clamping assembly must permit sufficient lateral movement of the clamp with respect to the rail to accommodate the movement of the crane wheels on the rail as limited by the tread width between the wheel flanges; third, lateral movement of the clamp assembly should not significantly alter the angle at which the clamping surfaces approach the sides of the crane rails; fourth, where the clamping surfaces comprise metal serrated shoes of hardness substantially greater than that of the rail, means should be provided to prevent the shoes from dragging on the rails when the crane moves along its rails; fifth, the clamping assembly should be of narrow cross section such that the opening in a travelled surface in which the rails are embedded, as in the case of a dock facility, does not exceed approximately three times the width of the top of the rail; and finally, means should be provided whereby remote sensing means are provided to indicate to the crane operator that the clamp is fully released prior to movement of the crane on its rails.

Johnson provides a fail-safe clamping apparatus wherein its clamping surfaces are externally mounted to facilitate periodic examination without disassembling the clamping assembly.

Applicant is also aware of the following co-pending patent applications: PCT application, publication no. WO 2009/092156 and corresponding U.S. patent application Ser. No. 12/018,085, for a Constant Force Rail Clamp. The Constant Force Rail Clamp applications disclose a rail clamp having a frame and a pair of levers. Each of the levers has a brake pad at a first end thereof, a cam follower at second end thereof, and is mounted to the frame by a pivot disposed between said first and second ends. A cam is disposed between the levers and a spring biases the cam in a first direction. A clamp release actuator is operable to displace the cam in a second direction. The second direction is opposite to the first direction. A pair of variably sloped cam surfaces are disposed on opposite sides of the cam. Each of the variably sloped cam surfaces is in contact with the cam follower of a corresponding one of the levers, and each of the variably sloped cam surfaces has a slope which varies to counteract variations in a spring force of the spring as the cam is displaced, thereby maintaining a constant clamping force.

SUMMARY OF THE INVENTION

In summary, the rail clamp according to the present invention may be characterized in one aspect as including a carriage having a lower end and an opposite upper end, where the carriage has a rigid base mounted at the lower end and an actuator frame mounted to the base so as to extend upwardly from the base to the upper end. At least one spring is mounted in the actuator frame at the upper end of the carriage. A selectively actuable actuator is mounted between the base and the spring(s). The actuator is actuable between a retracted position, a first extended position and fully extended position.

At least one guide wheel is mounted on a wheel support so as to depend therefrom for rolling engagement along a rail. At least one suspension frame is pivotally mounted at a first end of the suspension frame to the carriage and is pivotally mounted at an opposite second end of the suspension frame to the wheel support. The actuator operates on the first end of the suspension frame so as to elevate the carriage to a fully elevated position on the suspension frame as the actuator extends from the first extended position to the fully extended position.

A substantially vertically aligned, opposed facing pair of clamping levers is pivotally mounted to the base of the carriage, wherein lower-most ends of the pair of clamping levers are adapted for mounting a corresponding opposed facing pair of brake shoes thereon. The pair of clamping levers are pivotable relative to the base so as to clamp their lower-most ends together when opposite upper ends of the pair of clamping levers are moved apart.

A clamping lever retractor acts on the pair of clamping levers to move the lower-most ends of the pair of clamping levers apart to unclamp the rail when the actuator extends from the retracted position to the first extended position. When the actuator extends from the first extended position to the fully extended position positions the carriage in the fully elevated position and simultaneously elevates the lower-most ends of the pair of clamping levers above a substantially horizontal plane containing a lower-most surface of the guide wheels so that brake shoes mounted on the lower-most ends of the pair of clamping levers are elevated above the rail when the guide wheels are on the rail. When the actuator retracts from the fully extended position to the first extended position positions the carriage in a fully lowered position and simultaneously lowers the lower-most ends of the pair of clamping levers to bracket opposite sides of the rail.

When the actuator retracts from the first extended position to the retracted position it operates on the upper ends of the pair of clamping levers to move the uppers ends of the pair clamping levers apart thereby clamping the lower most ends together onto the opposite sides of the rail.

The rail clamp may include a load transfer frame mountable at at least a first end thereof to a piece of rail-mounted machinery, such as a crane, needing the braking assistance of the rail clamp. The lower-most ends of the pair of clamping levers are disposed relative to the mounting frame so as to depend downwardly below the load transfer frame when the carriage is in the fully lowered position. The load transfer frame may include at least a longitudinally spaced apart pair of load transfer members sandwiching in sliding engagement therebetween the base of the carriage and lower ends of the pair of clamping levers.

The load transfer frame may also include longitudinally extending load transfer walls wherein the pair of load transfer members may be laterally extending members mounted to the load transfer walls. The load transfer walls may be mounted to the first ends of the load transfer frame and extend to an opposite second end of the load transfer frame. The load transfer walls may be a laterally spaced apart pair of walls, spaced apart so as to enclose the carriage and the pair of clamping levers, wherein the pair of walls each have lower edges adjacent the rail when the guide wheels are on the rail, and wherein a cut-out is formed in each of the lower edges of the pair of side walls adjacent the lower most ends of the pair of clamping levers to provide access to the brake shoes when mounted thereon.

The cut-outs may have reinforcing there-around, for example, the reinforcing may be a reinforcing arch mounted around each the cut-out. Where the load transfer walls are I-beams, each of the reinforcing arches may be of a thickness substantially that of a corresponding lower flange of a corresponding I-beam.

The base of the carriage may include a laterally extending substantially parallel elongate pair of base members sandwiching the lower ends of the pair of clamping levers therebetween. The pair of clamping levers may be pivotally mounted to the pair of base members. In one embodiment the pair of base members are a pair of connector plates.

Each suspension frame may include at least a pair of parallelogram linkages pivotally mounted to the carriage so as to maintain a substantially vertical trajectory for movement of the carriage relative to the guide wheels. Each wheel support may include a vertically extending member wherein upper and lower linkages of the pair of parallelogram linkages are pivotally mounted to corresponding upper and lower ends of the vertically extending member of the corresponding wheel support.

The carriage may include suspension supports. The pair of parallelogram linkages may be mounted vertically spaced apart on the suspension supports.

A load transfer frame is provided for mounting at a first end thereof to a piece of rail-mounted machinery such as a crane wherein the carriage and the pair of clamping levers are mounted for substantially vertical translation within said load transfer frame, and wherein the pair of clamping levers transfer loads applied substantially longitudinally to the load transfer frame to brake shoes mounted to the pair of clamping levers when clamped onto the rail, wherein the load is transferred by compression against the pair of clamping levers.

The carriage may further include a guide member cooperating with the load transfer frames to guide the substantially vertical translation relative to the load transfer frame. The actuator frame may also include a cage of vertical uprights. A spring housing for the springs is mounted to the cage.

The base of the carriage may include a rigid cross member mounted between a laterally extending pair of base members, wherein the pair of clamping levers are mounted to, so as to be sandwiched between, the pair of base members, and wherein said actuator bears down against the cross member.

The actuator may include a piston actuating from a piston housing which bears against the upper ends of the pair of clamping levers. The piston housing may be wedge shaped. The housing bears against the upper ends of the pair of clamping levers so as to force the upper ends apart as the piston housing is lowered relative to the actuator frame and the base by a retraction of the piston into the piston housing as it is urged downwards by the spring(s). The elevation of the piston housing by actuation of the piston is against the return biasing force of the spring(s). The clamping lever retractor may be at least one resilient member urging the upper ends of the pair of clamping levers together as the piston housing is elevated.

The load transfer frame may further include lateral cross members bracketing the carriage. The carriage may include a longitudinally spaced apart parallel pair of base members, wherein the lateral cross members sandwich the pair of base members against the pair of clamping levers. The lateral cross members may include support plates extending laterally across the top of the load transfer frame, and wherein the support plates define an opening therebetween through which the carriage is mounted and through which the upper ends of the pair of clamping levers protrude. The opening may be sized in a longitudinal dimension so that the support plates are adjacent the upper ends of the pair of clamping levers.

In one embodiment each lever in the pair of clamping levers includes extensions of the upper ends of the levers which extend the upper ends of the levers longitudinally into snug adjacency with corresponding edges of the supports plates so that pivoting of the levers about the corresponding brake shoes bears the extensions against the support plates.

Advantageously the actuator drive accessories may be mounted on the support plates.

BRIEF DESCRIPTION OF THE DRAWINGS

In the drawings where like characters of reference denote corresponding parts in each view:

Figure 3:
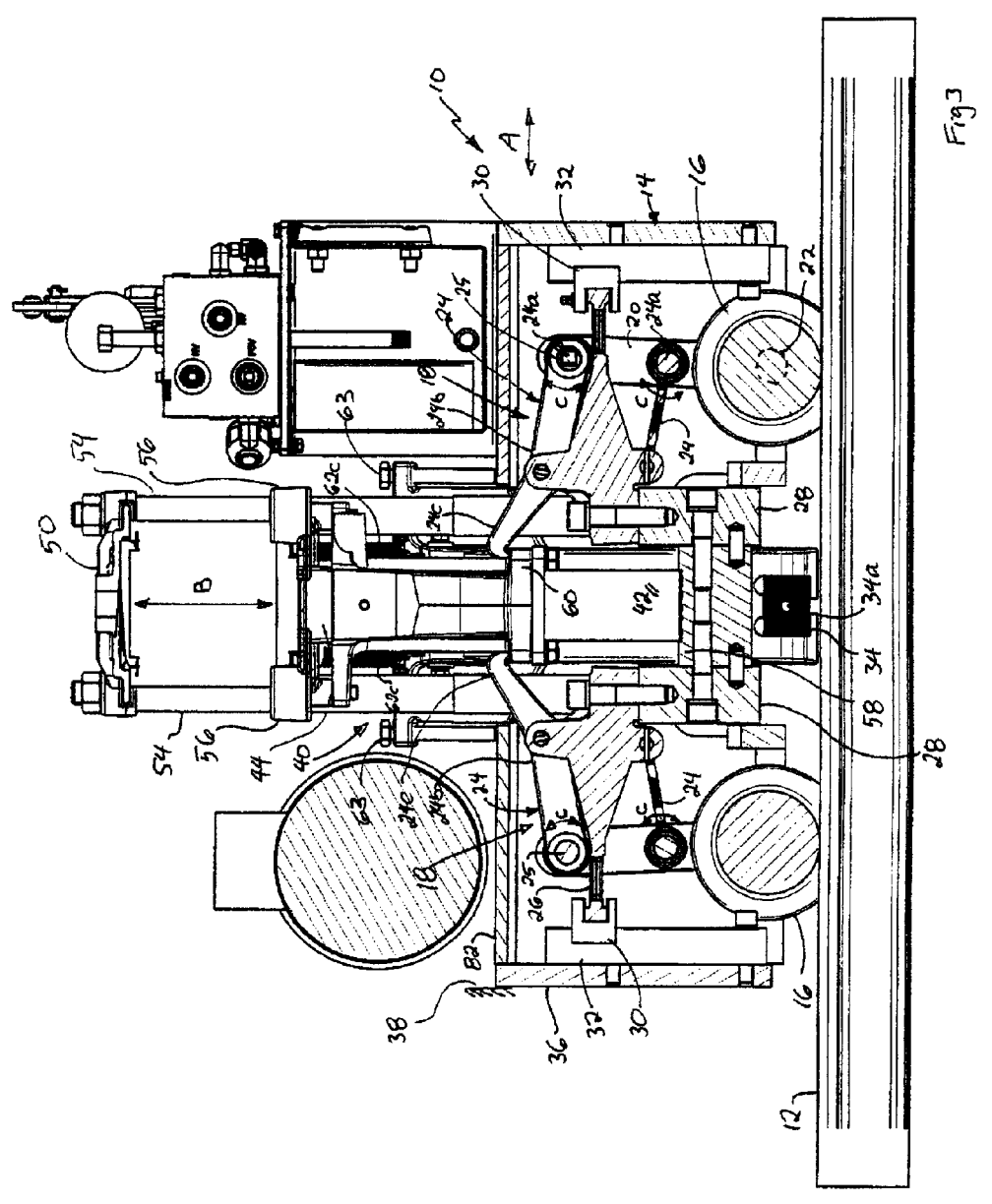

FIG. 3 is a cross-sectional view, sectioned vertically through the rail clamp of FIG. 1 and the rail on which the rail clamp sits, showing the clamping lever carriage in its elevated position, and also showing the hydraulic actuator equipment including motor, pump and reservoir mounted on top of the top supporting plates.

FIG. 5 is, in perspective view, the rail clamp of FIG. 2 with one load transfer side wall removed, but with the reinforcing arch remaining.

DETAILED DESCRIPTION OF EMBODIMENTS OF THE INVENTION

Figure 1:
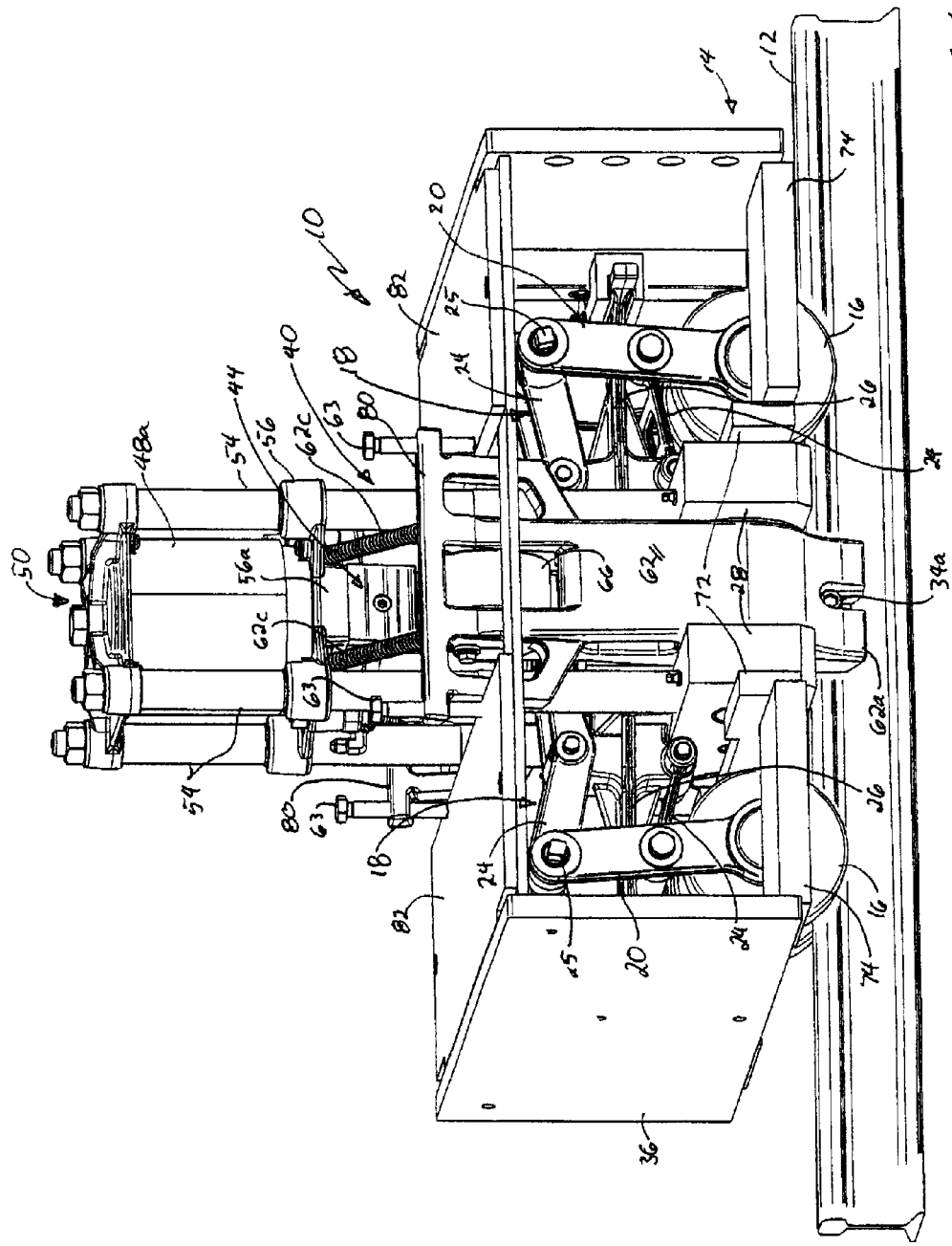
FIG. 1 is, in partially cut-away perspective view, the rail clamp according to one embodiment of the present invention with one load transfer side wall removed.
Figure 2:
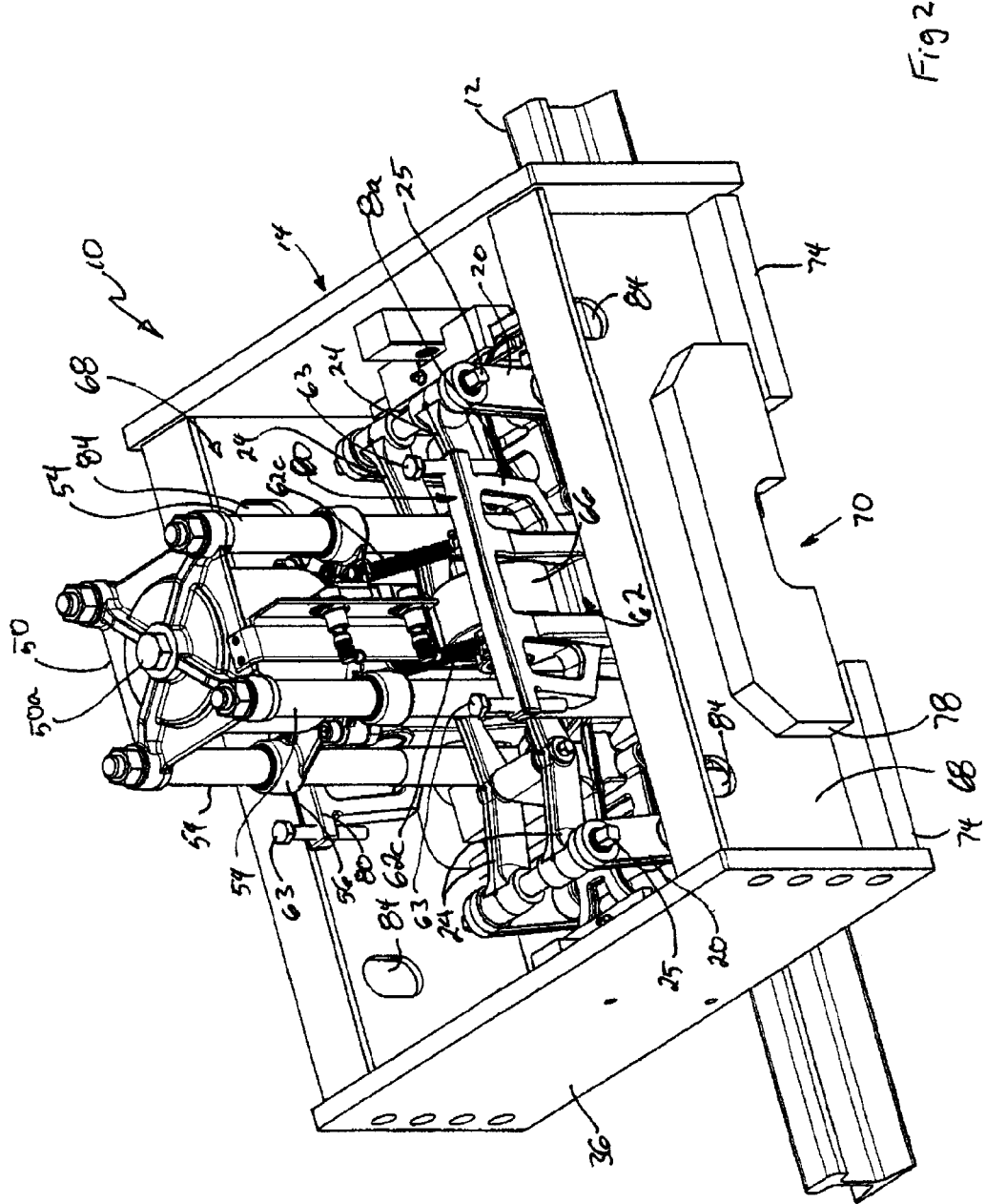
FIG. 2 is, in partially cut-away perspective view, the rail clamp according to one embodiment of the present invention with the top supporting plates removed.

A rail clamp 10 is provided for clamping onto a rail 12. Rail 12 includes side surfaces 12a and 12b and a top, or lateral surface 12c.

A load transfer frame 14 is mounted on wheels 16. An elevating suspension 18 is mounted on frame 14 and is adapted for movement relative to rail 12 and frame 14. In the case where the rail-mounted machine requiring the braking assistance of a rail clamp is a crane, the frame 14 is rigidly secured to the crane and moves with the crane along rails 12, in longitudinal direction A.

Elevating suspension 18 includes vertical wheel support members 20 on which are pivotally mounted suspension arms, which may be parallelogram linkages 24. Wheels 16 are rotatably mounted on axles 22 or the like on wheel support members. Within suspension 18, first ends 24a of parallelogram linkages 24 are pinned to the wheel supports 20. The opposite second ends 24b of parallelogram linkages 24 are pinned to uprights 26a of cantilevered arms 26. Cantilevered arms 26 are cantilevered from base ends 26b which are bolted down onto the upper surface of connector plates 28. The distal ends 26c of cantilevered arms 26, opposite to base ends 26b, each include a laterally elongate follower 26d that slidably mounts into a corresponding channel 30. Each follower 26d is free to move laterally relative to channel 30. Each channel 30 is slidably mounted onto a corresponding upright guide 32. Thus cantilevered arms 26 are constrained in the longitudinal direction parallel to rails 12, that is, parallel to direction A, but are otherwise free to float in the vertical and lateral directions, constrained however by the motion-in and of channel 30.

Keeping in mind that the rail clamps according to the present invention may advantageously be used as storm brakes for rail-mounted cranes, the primary forces which have to be resisted when the clamps are set so as to clamp rails 12 between brake shoes 34, are forces primarily acting parallel to direction A. For the specific application to rail-mounted cranes the rail clamp load transfer frame 14 is mounted at one end, by means of bolting end plate 36 to the crane structure 38. The brake shoes 34 are mounted on the lower-most ends of clamping levers 62, themselves pivotally mounted to the lower most end of a selectively elevatable clamping lever carriage 40. Carriage 40 travels vertically on suspension 18. In a lowered, brake-set position brake shoes 34, positioned in opposed facing pairs, are clamped onto opposite sides 12a and 12b of rails 12. In an elevated position, the brakes have been released and the carriage elevated in direction B on suspension 18. The range of vertical movement is constrained by the rotation of parallelogram linkages 24 as they rotate in directions C on guide wheel supports 20.

A hydraulically actuated piston 42 is hydraulically driven from piston cylinder housing 44 downwardly against the base of clamping lever carriage 40. This drives piston cylinder housing upwardly against the return biasing force of a nested single pair or pairs of inner and outer helical coil springs 46a and 46b respectively, contained within cylindrical spring housing 48. In alternative embodiments, more than one pair of nested springs are employed, for example up to six pairs of nested springs, although this is not intended to be limiting. Spring housing 48 includes an outer cowling 48a in which is snugly telescopically nested a cylindrical spring retaining basket 48b. Access to the springs within spring housing 48 is via removable cap 50 held in place on the upper-most end of a four-post actuator frame consisting of four oppositely disposed tie rods 52 mounted journalled vertically upwardly through hollow posts 54. The cap 50 is bolted onto the upper most ends of tie rods 52 and posts 54. The lower most ends of tie rods 52 are rigidly mounted into the upper surfaces of the laterally extending parallel pair of connector plates 28. Connector plates 28 are joined together by a base member 58 to form a "H"-shaped base structure which forms the base of clamping lever carriage 40.

Piston cylinder housing 44 is rigidly mounted to, so as to be suspended centrally between, four oppositely disposed tubular guides 56 mounted on a horizontal guide frame 56a. Guides 56 are slidably mounted onto posts 54 so as to vertically guide the translation of piston cylinder housing 44 as hydraulic piston 42 is hydraulically actuated so as to extend from the lower most end of housing 44.

Housing 44 is elevated vertically through what may be characterized as a two stage translation as piston 42 extends from housing 44 so as to bear against base member 58 rigidly mounted between the pair of connector plates 28. The first stage of the two stage translation releases the brake shoes 34 from their clamped and set position clamped onto the top of rails 12. The second stage follows the first stage and engages a tip extensions 24c, extending cantilevered from second end 24b of the upper linkage of parallelogram linkages 24, against a flange or ledge 60 extending from cylinder housing 44. Ledge 60 may be annular. Thus as cylinder housing 44 is driven upwardly by the actuation of piston 42, parallelogram linkages 24 are simultaneously rotated in direction C upwardly relative to guide wheel supports 20 thereby carrying cantilevered arms 26 upwardly also. Because bases 26b are rigidly mounted down onto connector plates 28 by bolts 26; as arms 26 are elevated, so too are connector plates 28. As connector plates 28 are elevated they carry rigidly between them base member 58 thereby carrying the entire piston 42 and cylinder housing 44 assembly and the brake shoe clamping assembly described below.

Figure 4A:
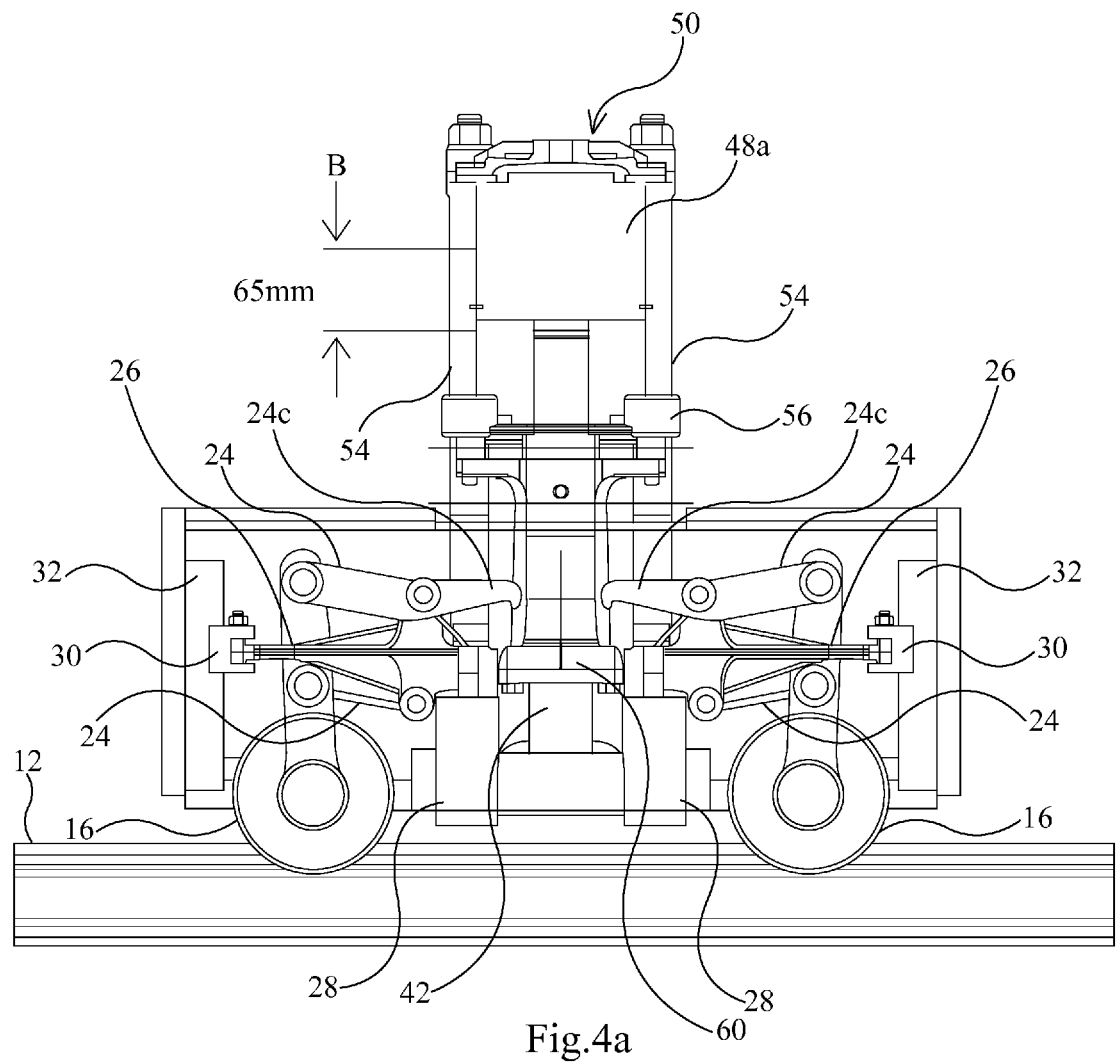
FIG. 4a is the cross-sectional of FIG. 3 with the clamping levers removed and the clamping lever carriage in its lowered position.
Figure 4B:
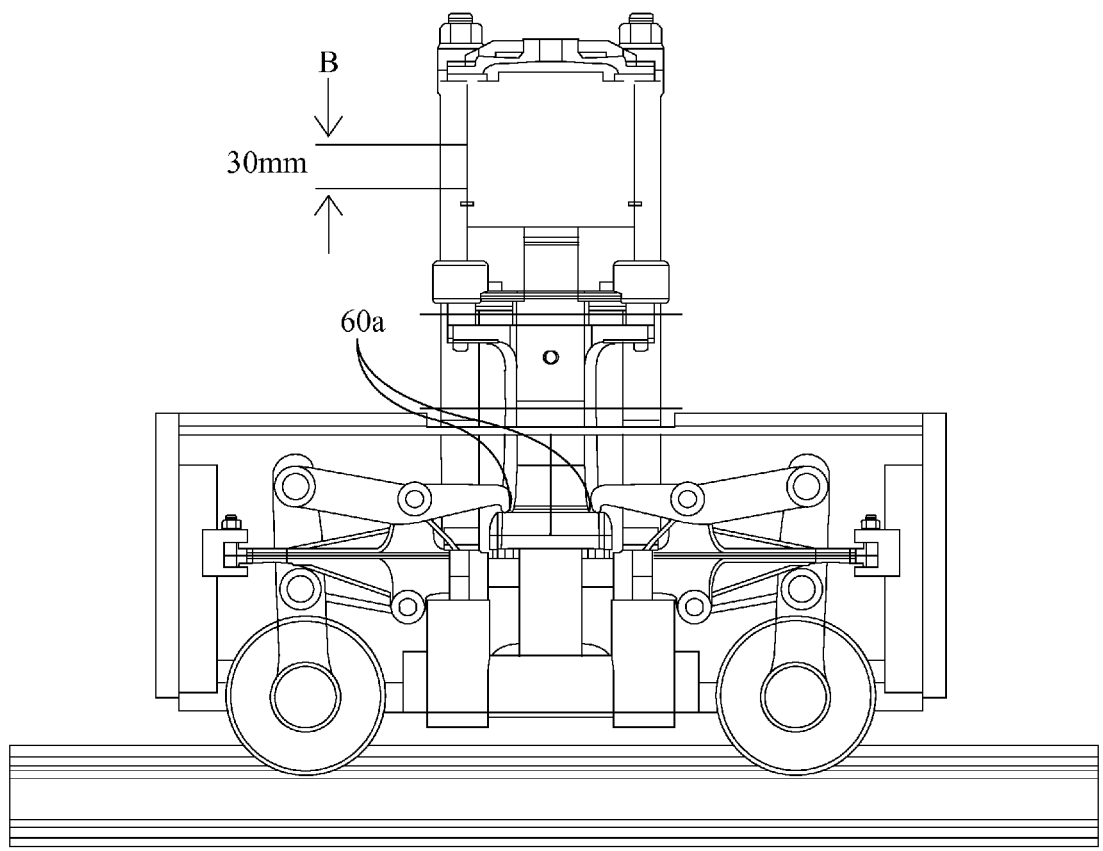
FIG. 4b is the view of FIG. 4a with the cylinder extended until the suspension arms contact the annular flange around the cylinder.
Figure 4C:
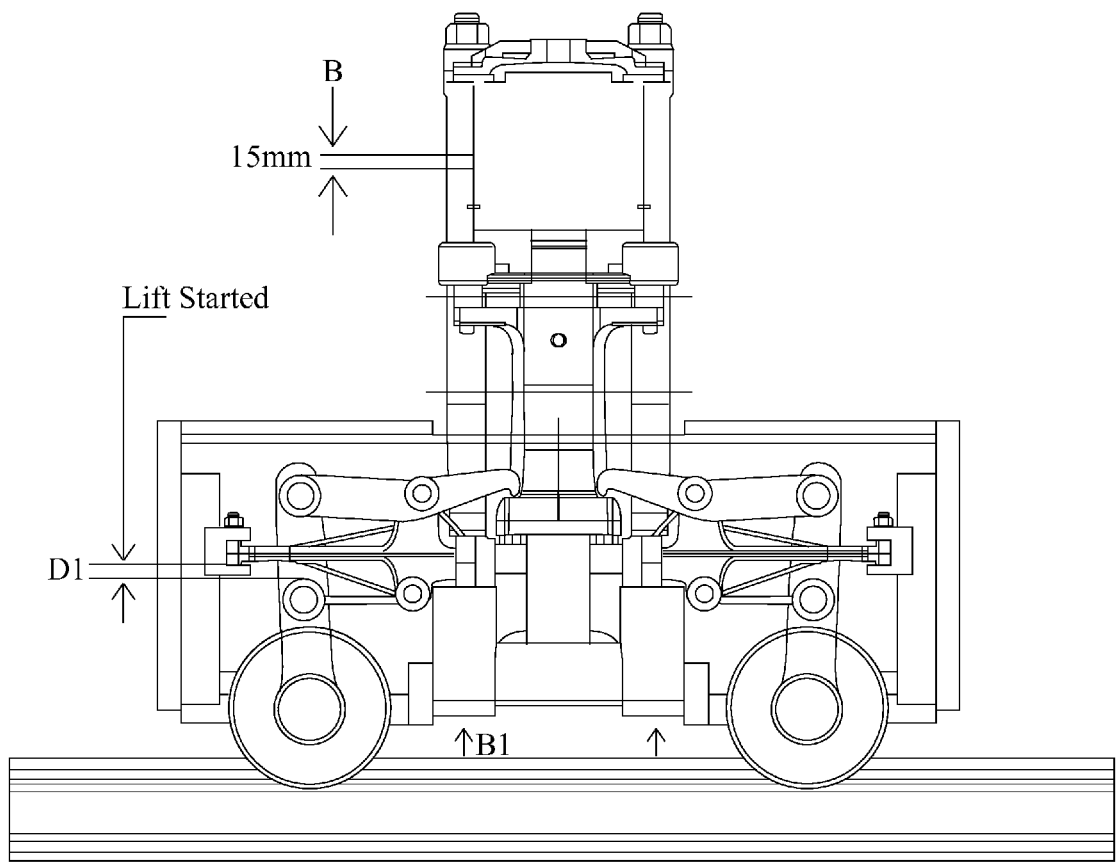
FIG. 4c is, the view of FIG. 4b, with the cylinder further extended so as to start upward rotation of the suspension arms as the carriage elevates.
Figure 4D:
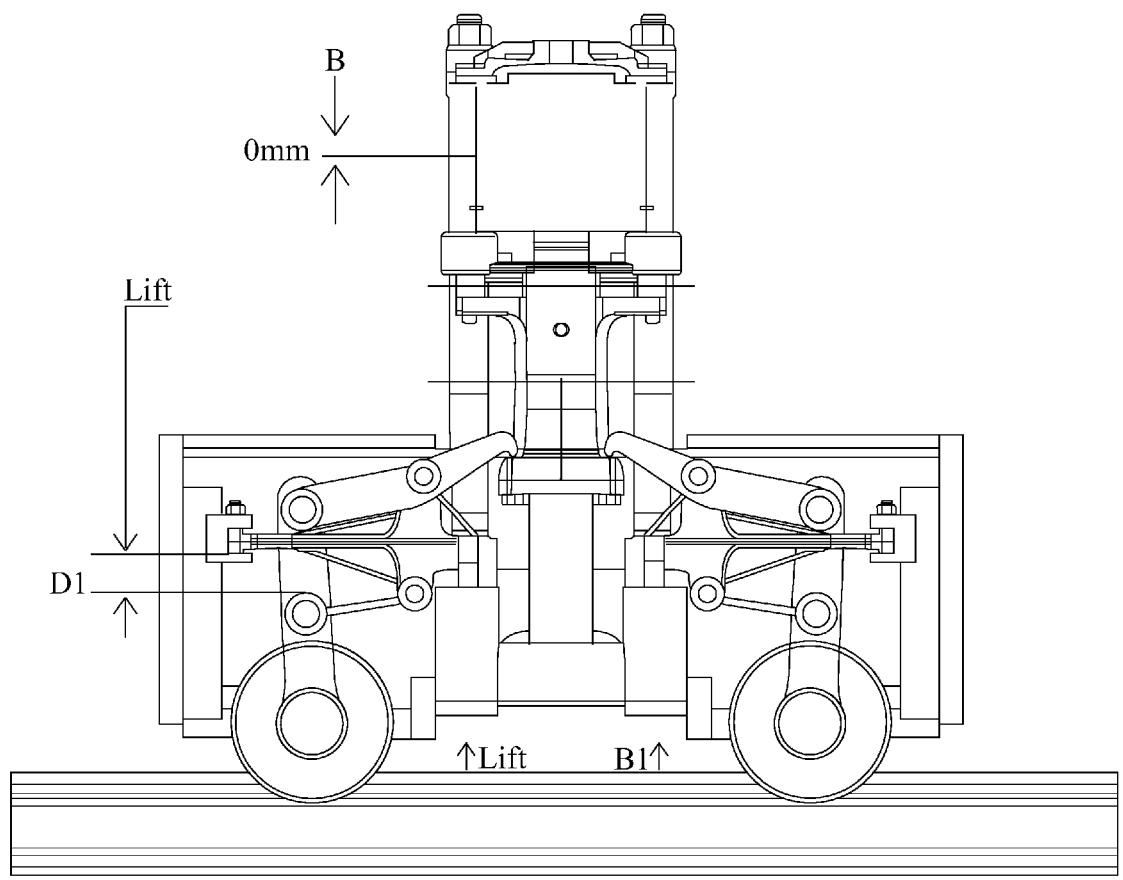
FIG. 4d is the view of FIG. 4c with the cylinder fully extended so as to elevate the carriage to its fully raised position.
Figure 6:
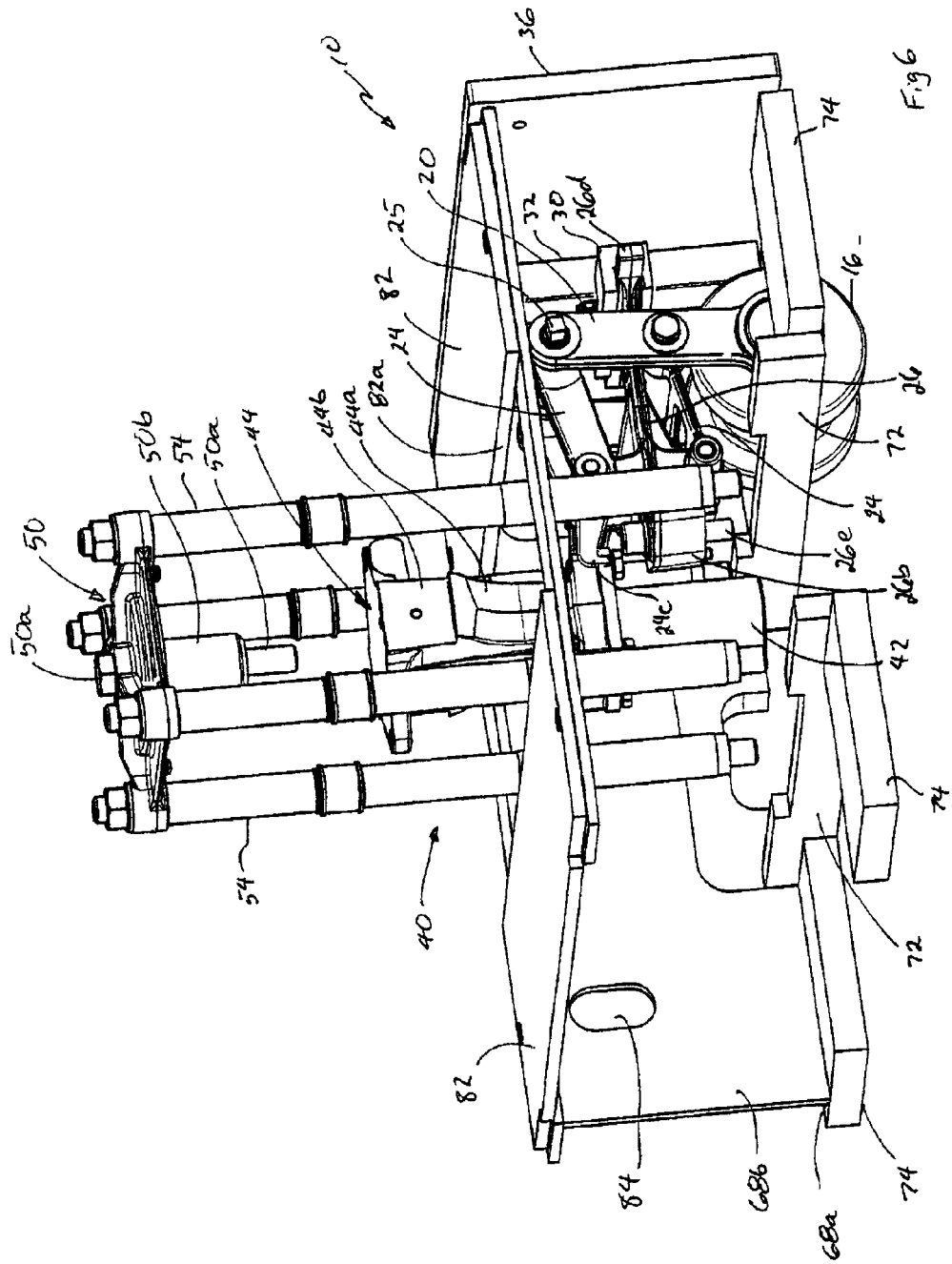
FIG. 6 is, in side perspective view, the rail clamp of FIG. 1 partially cut-away to show the underlying structure of the load transfer frame, and to show the clamping lever actuator and actuator frame of the clamping lever carriage.
Figure 7:
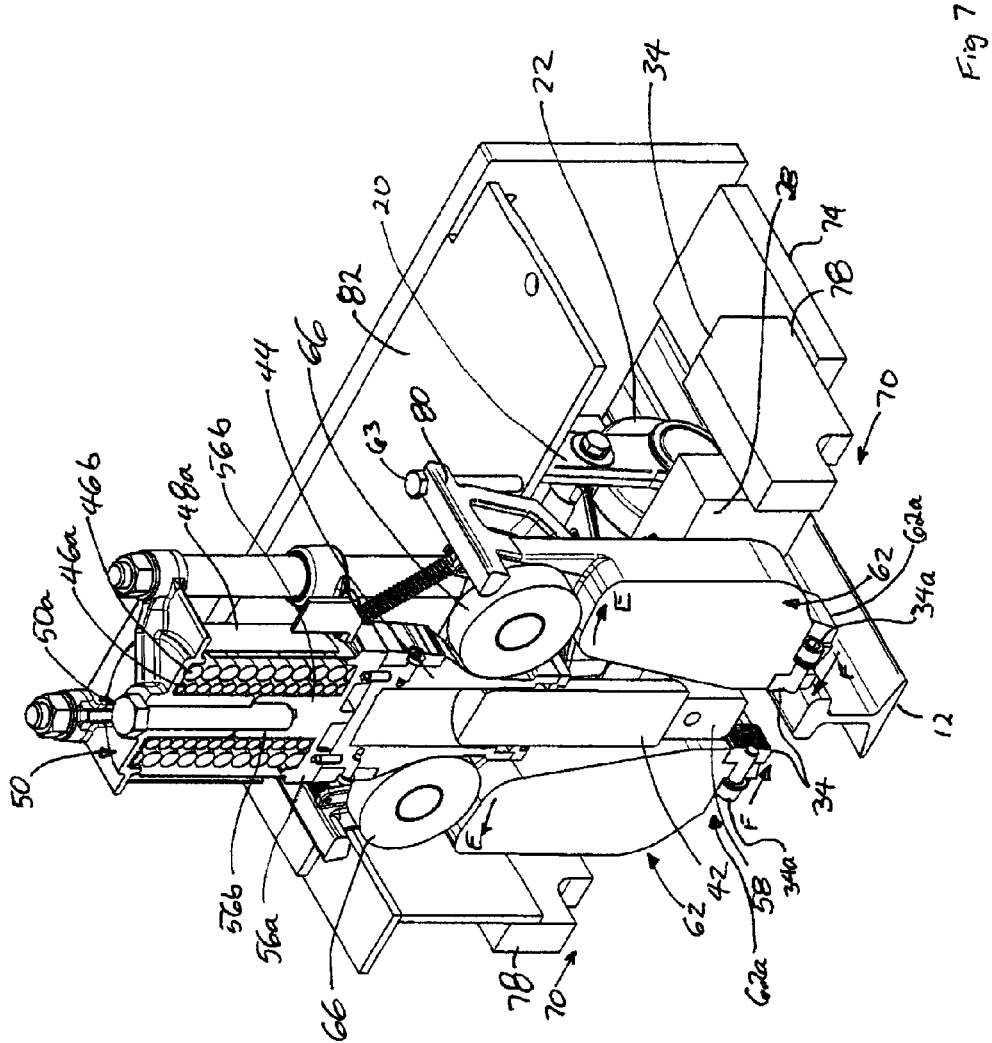
FIG. 7 is a cross-sectional view of the rail clamp of FIG. 5, sectioned vertically and laterally in a plain orthogonal to the rail so as to bisect the clamping lever carriage and clamping levers.
Figure 8:
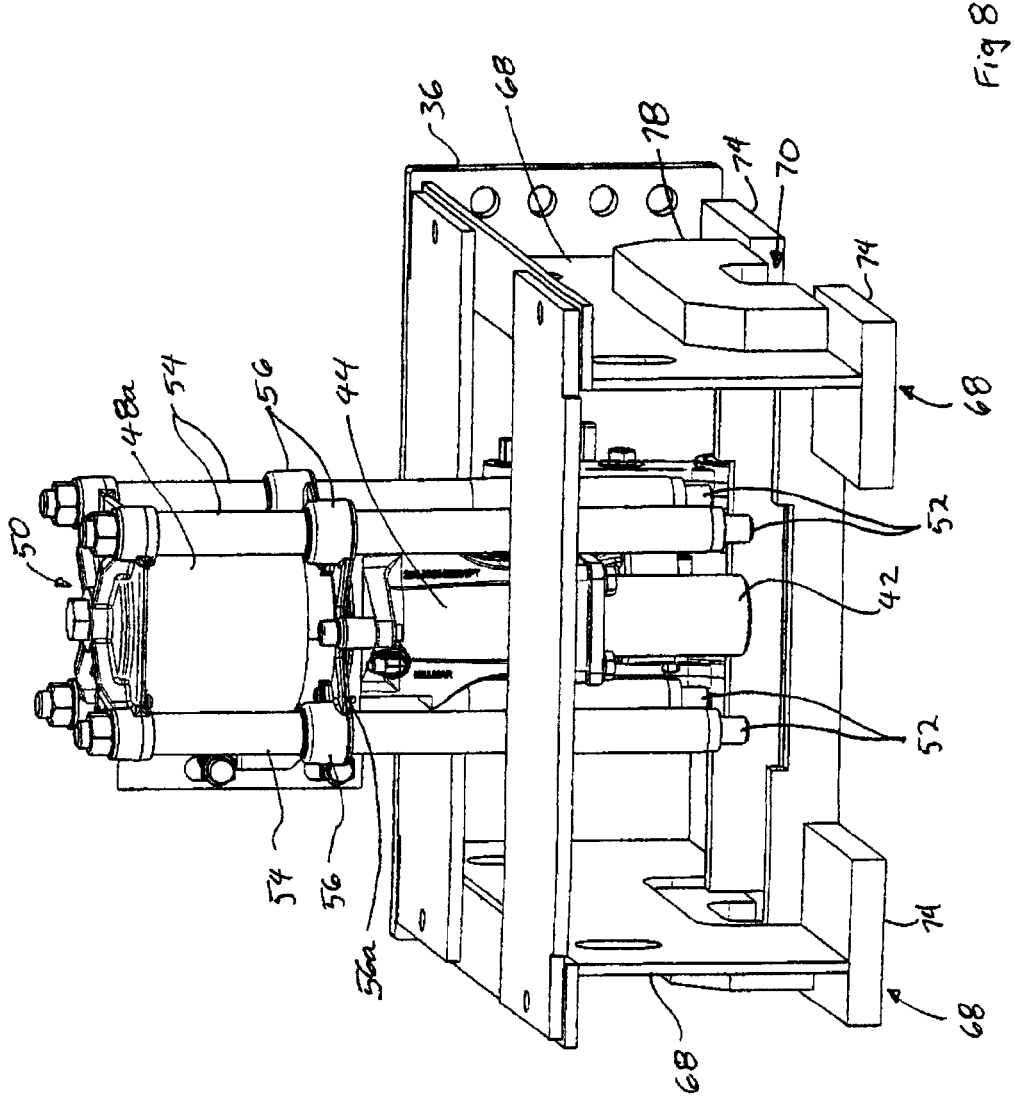
FIG. 8 is, in end perspective view, the rail clamp of FIG. 6 showing both load transfer side walls in place and the spring housing in place.
Figure 9:
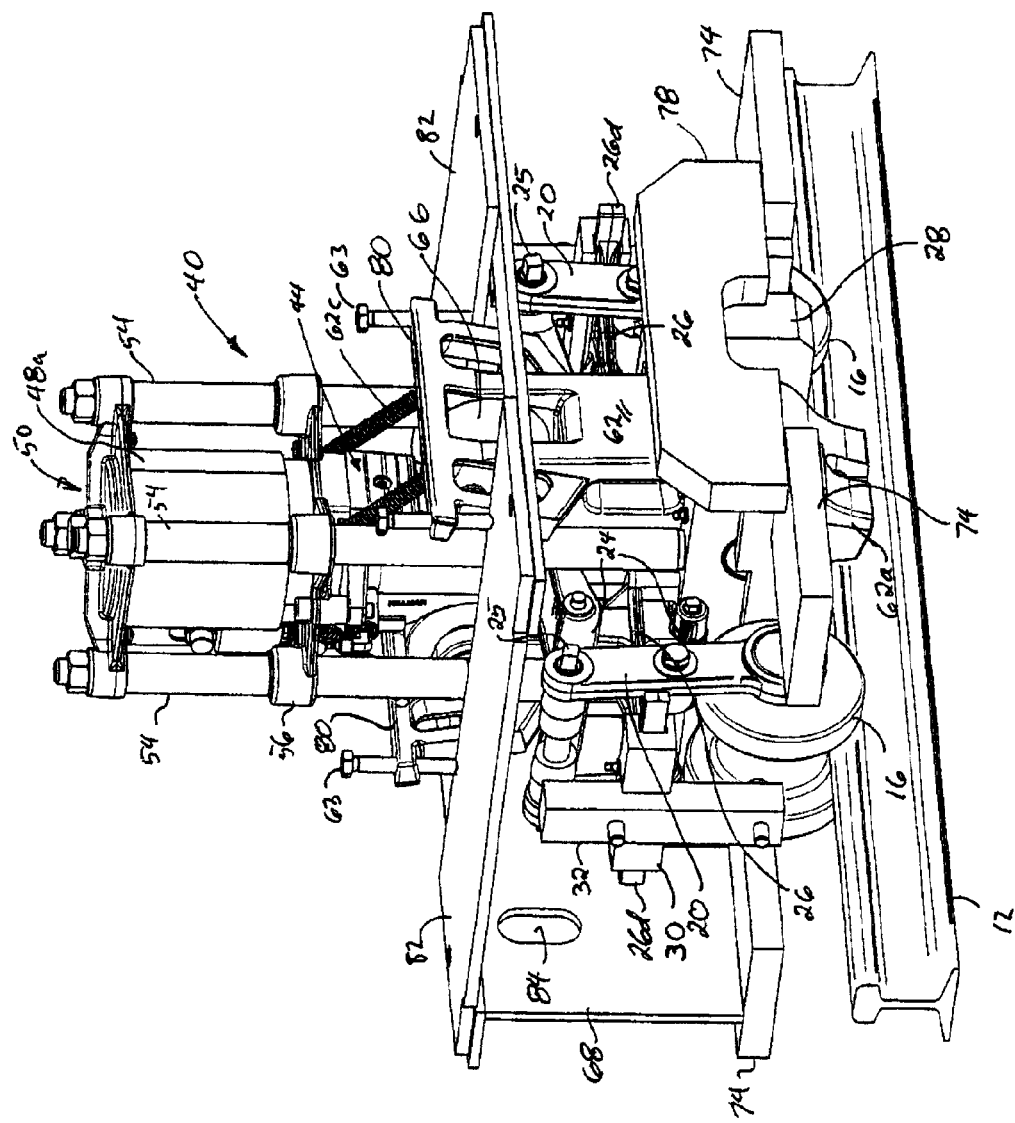
FIG. 9 is, in perspective view, the rail clamp of FIG. 1 with the end plates and one load transfer side wall removed.
Figure 10:
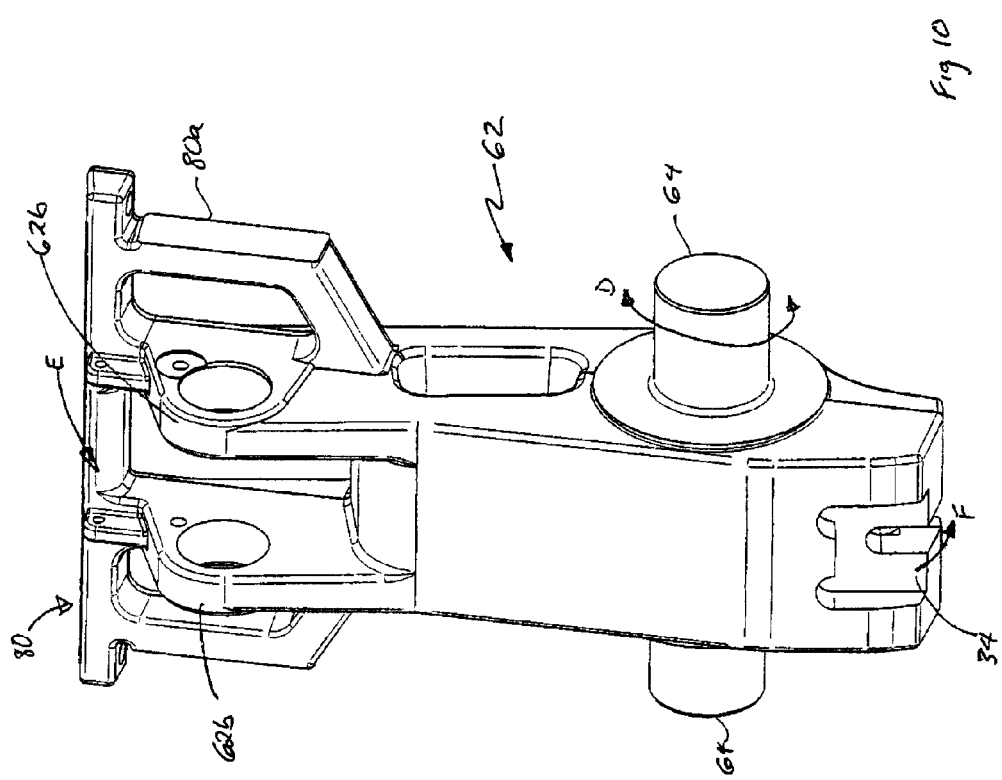
FIG. 10 is, in perspective view, one embodiment of a clamping lever for use in a rail clamp according to the present invention.
Figure 11:
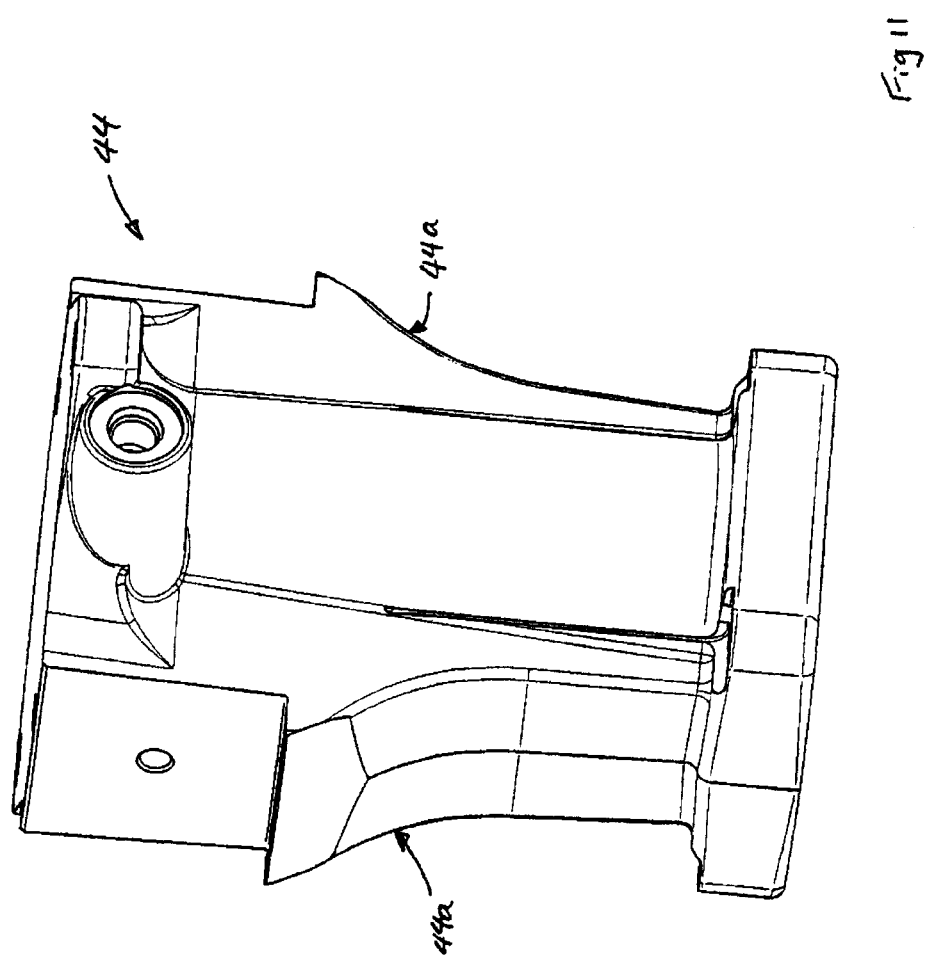
FIG. 11 is, in perspective view, one embodiment of a piston housing of the clamping lever actuator of the rail clamp according to the present invention.
Figure 12:
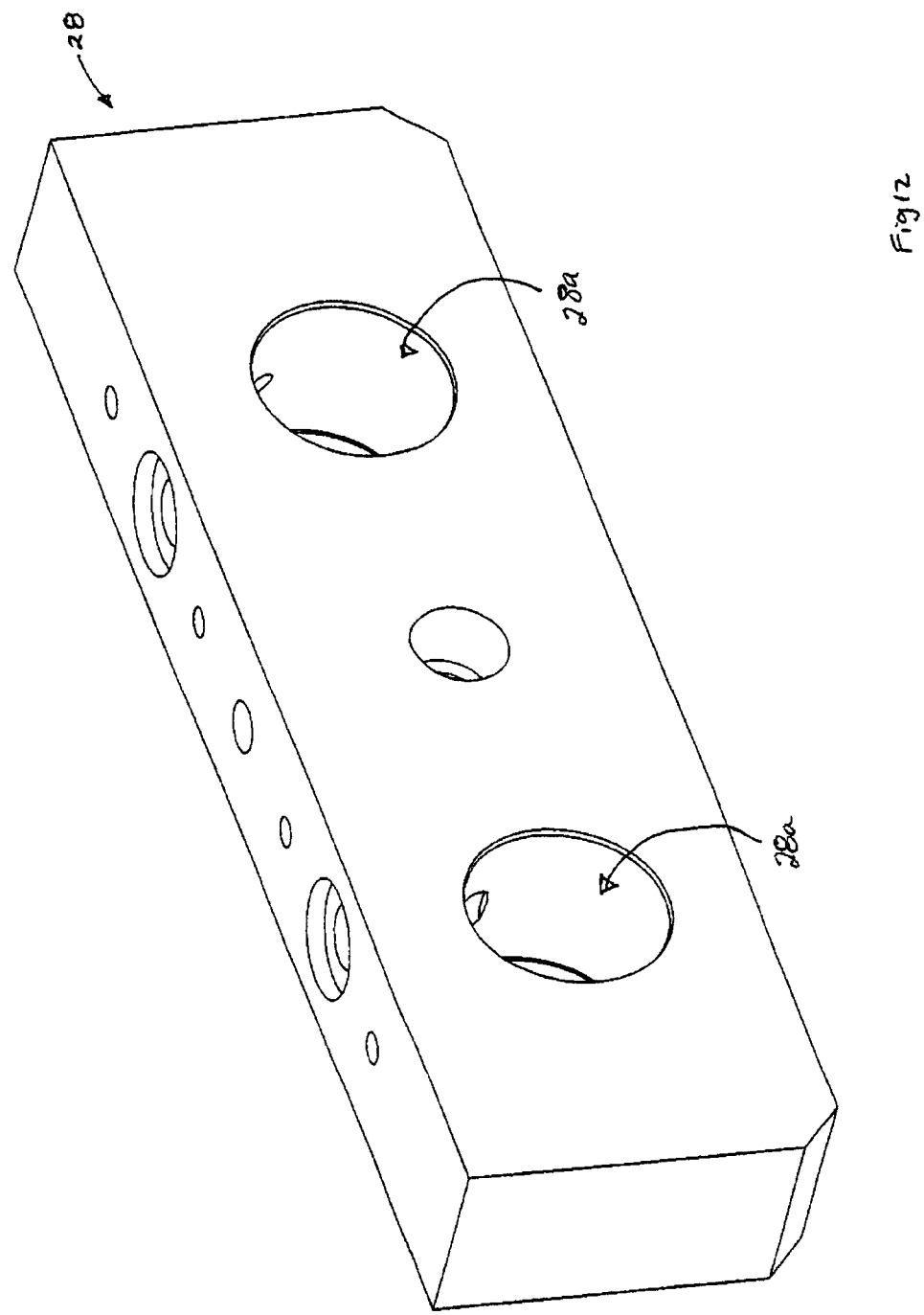
FIG. 12 is, in perspective view, one connector plate from the clamping lever carriage according to one embodiment of the present invention.
Figure 13:
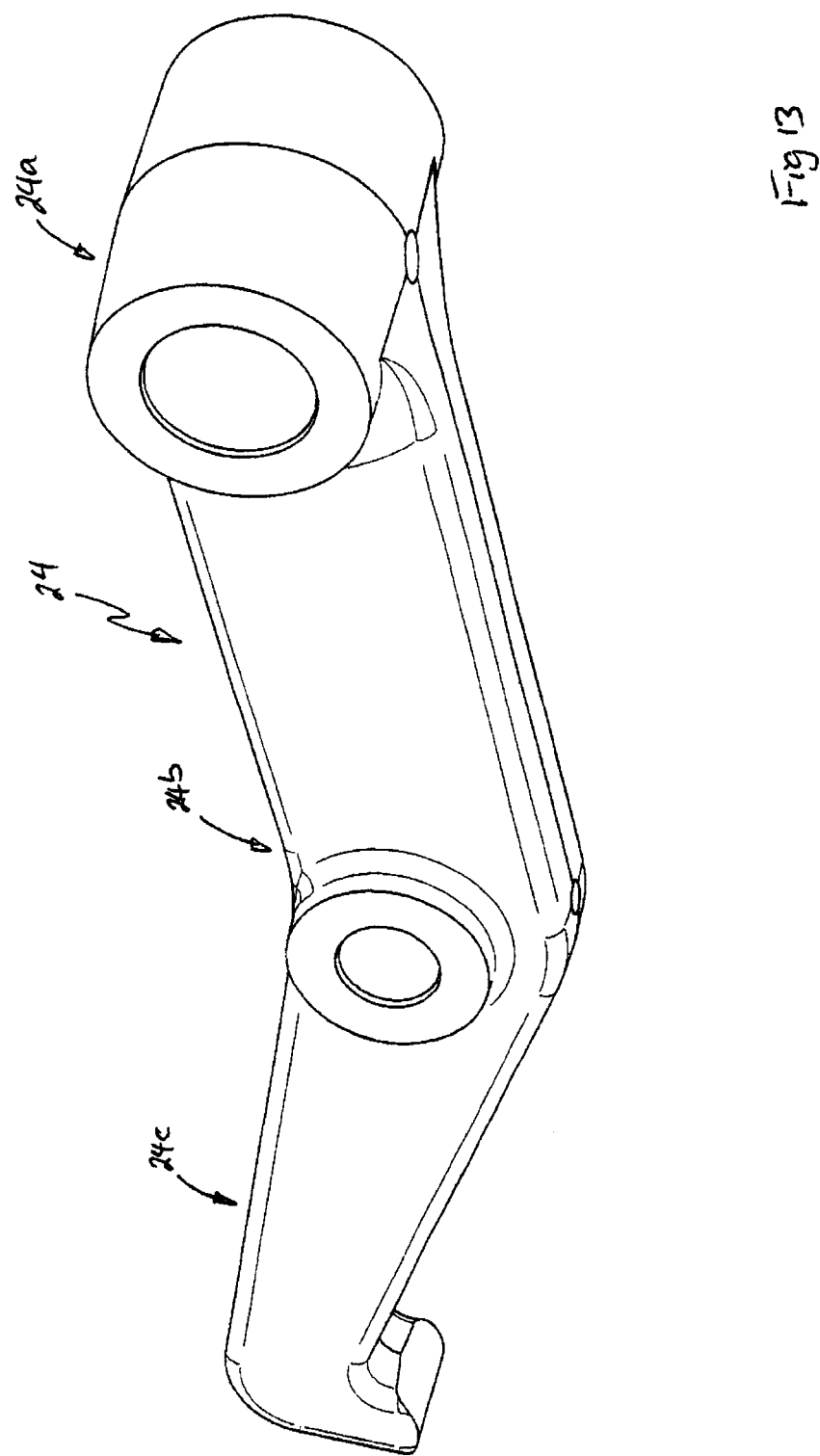
FIG. 13 is, in perspective view, an upper suspension arm of the parallelogram links according to one embodiment of the rail clamp according to the present invention.
Figure 14:
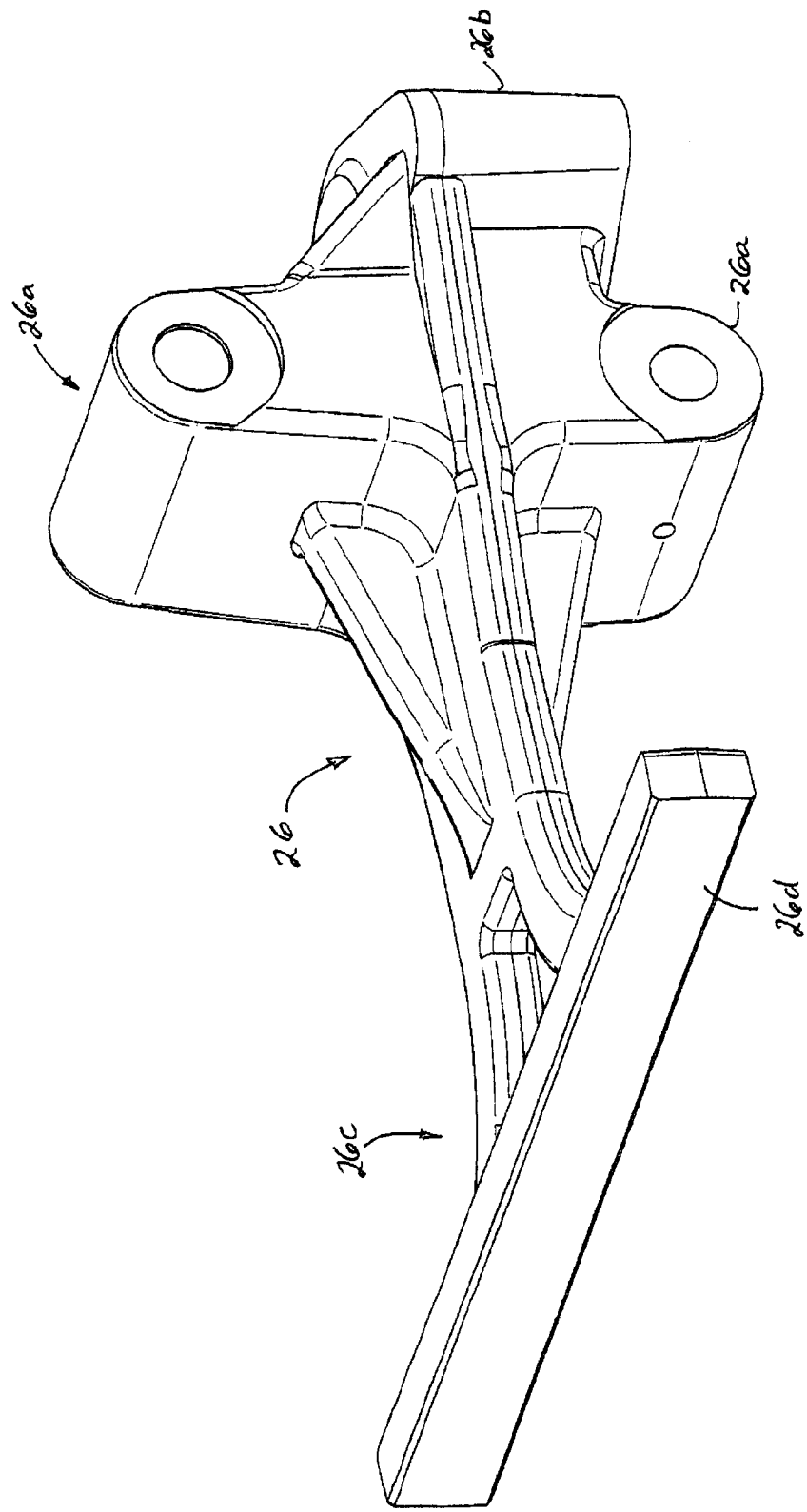
FIG. 14 is, in perspective view, one cantilevered arm of the suspension of the clamping lever carriage according to one embodiment of the rail clamp according to the present invention.
Figure 15:
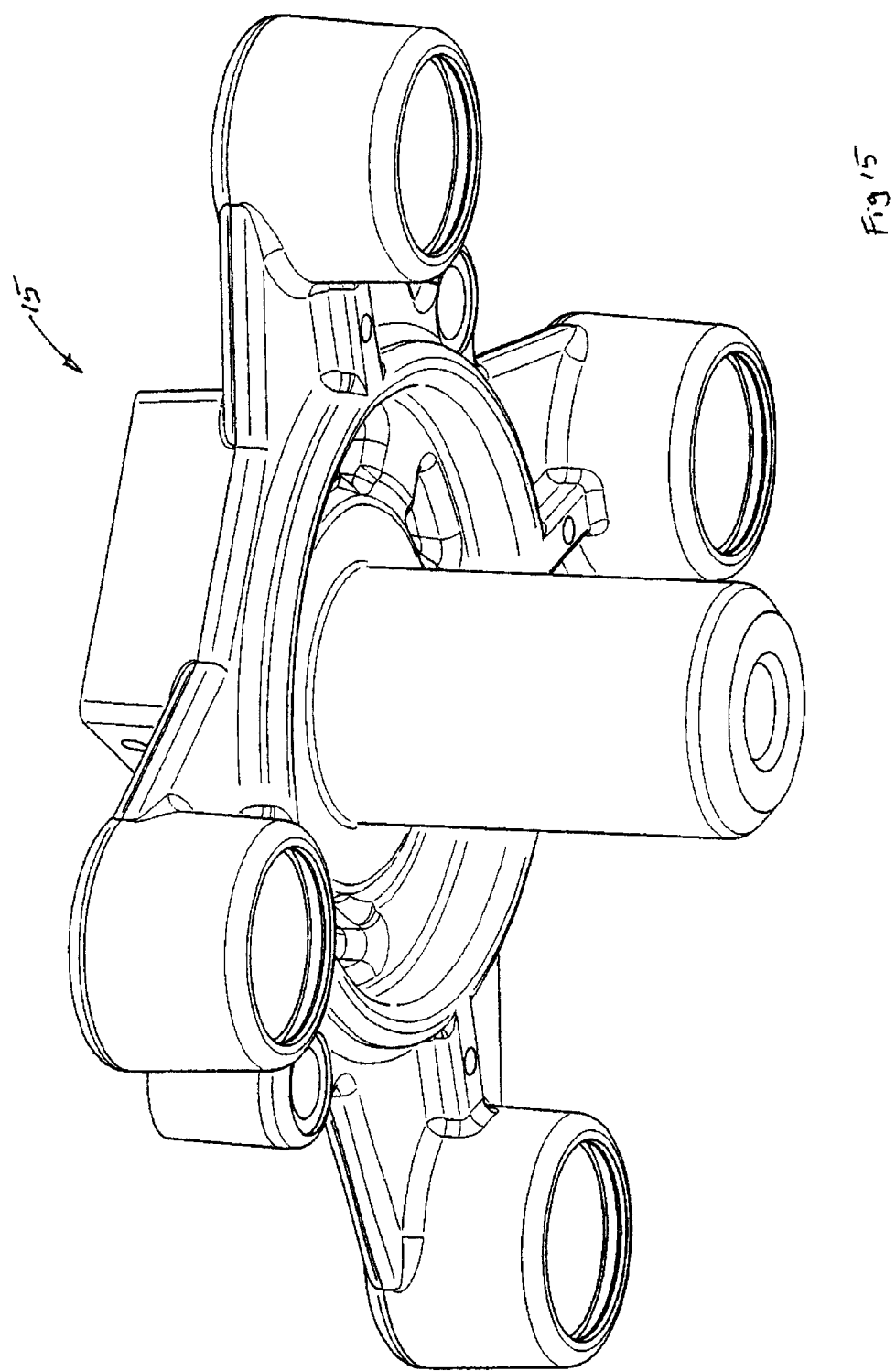
FIG. 15 is, in perspective view, the actuator frame cap of the clamping lever carriage according to one embodiment of the present invention.
Figure 16:
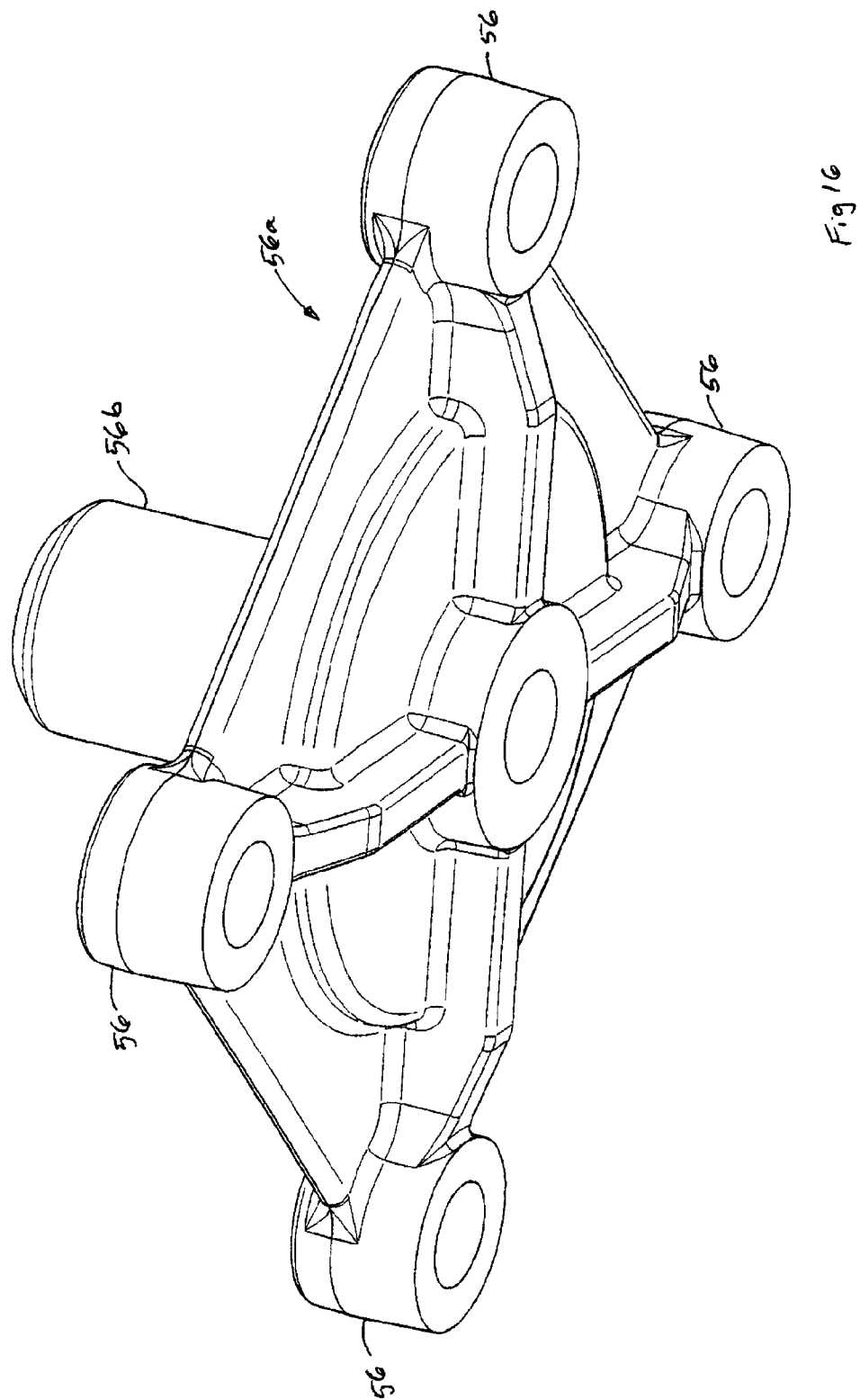
FIG. 16 is, in perspective view, a horizontal guide frame supporting tubular guides for the actuator frame of the clamping lever carriage according to the present invention.

Simultaneously during the second stage of the vertical translation, the actuation of piston 42 from cylinder housing 44 slides tubular guides 56 over posts 54, while also driving basket 48b upwardly so as to nest within cowling 48a thereby compressing springs 46a and 46b. Cap 50 constrains the upper ends of the springs. Center bolt 50a threads down into a corresponding threaded core of member 56b which extends vertically up from guide frame 56a through the lower end of spring 46a. Bolt 50a is used to cage the spring chamber for maintenance purposes. In particular, bolt 50a keeps the springs in the spring chamber compressed without the use of the hydraulic power of the cylinder. Cap 50 is bolted to the four posts 54 to make a rigid structure together with the connector plates and base member 58. Bottom cap 56 slides on posts 54 together with cylinder-wedge body 44. Thus in the fully lowered position of FIG. 4, by way of example, the stroke is shown as being 65 mm in direction B. In this position, the clamping lever 62 have been lowered and the brake shoes 34 engaged against rail 12. There is minimal or no pressure in the hydraulic system actuating cylinder 42 so cylinder 42 is fully retracted. In FIG. 4b, the stroke has been reduced to 30 mm as the upper suspension arms start contact annular flange 60 at 60a. At this position, there is a gap between the brake and the rail and therefore the carriage 40 is free to translate upwardly. In FIG. 4c, the stroke has been reduced to 15 mm as cylinder 42 extends so as to raise carriage 40. At this position the carriage is elevated approximately half way as illustrated by the corresponding lift dimension dl as the carriage is lifted in direction B1. In FIG. 4d, the carriage is fully elevated as shown by the height of dimension d1.

An opposed facing pair of clamping levers 62 are pivotally mounted on pins 64, journalled in bores 28a in connecting plates 28. Connecting plates 28 extend laterally; that is, they extend perpendicularly relative to rails 12. Thus pins 64 are aligned parallel to rails 12. As clamping levers 62 rotate in direction D about pins 64, brake shoes 34, mounted by bolt 34a through apertures in the lower most ends 62a, are either translated towards or away from the surfaces 12a and 12b of rails 12, assuming that clamping levers 62 are in their lowered position. Clamping levers 62 are lowered on carriage 40 as the hydraulic pressure in cylinder housing 44 is reduced thereby allowing piston 42 to retract upwardly into the housing urged by the expansion of springs 46a and 46b. As the springs expand cylinder housing 44 is driven downwardly guided by tubular guides 56 sliding on posts 54.

Wheels 66 rotatably mounted between parallel flanges 62b on clamping levers 62 are urged against an upwardly diverging cam surface 44a and onto a diverging wedge 44b releasably mounted onto cylinder housing 44 in line with cam surface 44a. As wheels 66 roll upwardly over cam surfaces 44a and thence onto wedges 44b, the uppers ends of clamping levers 62 are forced apart, that is are rotated in direction E about pins 64 thereby driving brake shoes 34 in directions F so as to close the gap between opposed facing pairs of brake shoes 34. Initially however, as wheels 66 commence moving upwardly along cam surfaces 44a, that is, as cylinder housing 44 translates downwardly, so to the parallelogram linkages 24 also rotate downwardly thereby lowering carriage 40 and along with it the pairs of clamping levers 62, so as to position brake shoes 34 on opposite sides of the rails 12. During lowering the brake shoes are maintained apart by springs 62c pulling inwardly on the upper ends of clamping lever 62. Threaded bolts 63 provide adjustable stops to arrest the downward translation of carriage 40.

Bolts 63 are used to keep the carriage elevated while springs 46a and 46b are caged by means of caging bolt 50a an with no hydraulic power applied (for example, during maintenance). During normal operation bolts 63 are secured in an unscrewed position or kept separately as part of a maintenance kit.

Advantageously, brakes shoes 34 are vertically serrated and have a hardness of approximately Rockwell Hardness Re 56-58. Thus the brake shoes 34 are harder than the material of rails 12 so that the serrations may bite into the rails when clamped thereon with sufficient force.

The combined spring strength of springs 46a and 46b varies as the springs expand, varying between a maximum compression force of approximately 30 kilo newtons (30 KN) when the springs are fully compressed, and lowering to approximately 21 kilo newtons (21 KN) as the springs reach approximately their mid-expansion, which corresponds to engagement of brake shoes 34 with the sides of rails 12. The combined downward spring force of 21 KN acting on cylinder housing 44 and, via cam surfaces 44a and wedges 44b, the conversion of the downward spring force into a moment acting on clamping lever 62 causing the clamping of the brake shoes 34 onto rails 12 as wheels 66 are driven apart, results in a holding force of approximately 250 kilo newtons (250 KN). Assuming a gripping co-efficient of approximately 0.5, the clamping force for each brake shoe is also approximately 250 KN.

When brake shoes 34 are clamped and set onto rails 12, they provide collectively the resistance to, for example rail mounted cranes, shifting along the rails under the influence of wind, storms etcetera. Thus primarily the brake pads resist rolling translation along the rails of the rail-mounted machinery they provide the braking for. Cranes are one example. The brake pads also however provide resistance to bending moments for example moments tending to rotate the clamping levers in a plane parallel to the plane containing the faces of the brakes shoes, that is about a lateral axis passing through the brake shoes.

Thus for the optimum performance of the rail clamps, it is important that the brake shoes be maintained in good order. Thus, even though the brake shoes are made of particularly hard material eventually the sharp edges of the serrations on the brake shoes will dull, thereby potentially reducing the setting of the serrations into the rails and thereby lowering the resistive or gripping co-efficient, and thus lowering the holding force of the rail clamps. In order then to maintain optimum performance of the rail clamps, it is desirable that regular changing of the brake shoes be encouraged. In applicants view, it is more likely that the brake shoes will be regularly replaced when the replacement of the brake shoes is not an overly arduous task for workmen, and also when the state of the wear on the brake shoes may be easily ascertained by the workmen.

In the present invention the elevation of clamping lever carriage 40 provides for ease of checking the wear of brake shoes and for ease of replacing brake shoes. Firstly, when carriage 40 is in its elevated position, brake shoes 34 are at their maximum separation and elevated above the height of rails 12. Second, in what are substantially I-beams, walls 68 which form the longitudinally extending walls of load transfer frame, cut-outs 70 are formed in the lower flanges and corresponding portion of the web of I-beams 68. The position of cut-outs 70 correspond to the position of brake shoes 34 when in their elevated position. Thus a workman may reach through cut-outs 70 to obtain access to brake shoes 34 and in particular to their corresponding mounting bolts 34a to thereby simplify the checking and replacement of worn brake shoes. In order not to jeopardize the holding force provided by the clamped brake shoes cut-outs 70 could not however be allowed to weaken the structure of I-beams 68.

In operation, end plate 36 is bolted to a rail-mounted machine such as a crane to help prevent the machine from undesirably moving along the rails due to buffeting of the machine by wind or storm. With the brakes clamped on, and with a wind loading applied to a rail-mounted machine, the machine might freely roll along the rails, thereby risking damage were it not for the rail clamps. Thus with the rail-mounted machine bolted to end plate 36, large forces may be applied either in compression or tension to end plate 36 by the rail mounted machine either being pushed or pulled relative to the rail clamp. These large forces are transmitted to the brake shoes. In particular, if the applied force is for example tension applied to end plate 36 in direction G (as seen in FIG. 5), this then tends to pull the connector plate 28 closest to end plate 36 away from the clamping levers 62, and to pull the opposite connector plate 28, on the side of clamping lever 62 opposite from end plate 36, against clamping levers 62. Connector plates 28 move vertically with the rest of carriage 40, sliding vertically over and relative to bottom cross bars 72. Because plates 28 and cross bars 72 are merely sandwiched together, that is, are not linked to one another, then force may only be transferred in compression between the two. Thus in the example of tension being applied in direction G, the force is transmitted by connector plate 28 on the side closest to end plate 36 compressing against the corresponding bottom cross bar 72, and by the opposite connector plate 28 compressing against the corresponding side of clamping lever 62.

Bottom cross bars 72 are rigidly mounted laterally across the guide wheel openings under frame 14, and in particular are rigidly mounted to the bottom guide bars 74. Bottom guide bars 74 are rigidly mounted to the lower edges of end plates 36 and 76. Thus, by forming cutouts 70 in the lower edges of I-beams 68, where cutouts 70 correspond longitudinally to the position of clamping levers 62, the force in direction G will tend to tear I-beams 68 vertically starting at cutouts 70 and tearing upwardly from there through the web 68b of each I-beam. This is because the lower flanges 68a of I-beams 68 have been entirely cut through by cutouts 70, and cutouts 70 have also cut upwardly into the webs 68b. Consequently reinforcing arches 78 are rigidly mounted to bottom guide bars 74 so as to provide a force transferring bridge in the longitudinal direction between longitudinally spaced apart pairs of bottom guide bars 74. Reinforcing arches 78 may for example be made of one and one quarter inch steel plate so as to bear the loading which would otherwise be born by web 68b and flanges 68a. Applicant has also noted that frame 14 may deform during high loading and so has also provided bottom cross bars 72 to add additional stiffness laterally across the bottom of the enclosure.

Because of the suspension of guide wheels 16 on parallelogram linkages 24, and with the cantilevered ends 26c of each of the oppositely disposed pair of cantilevered arms 26 free floating in the lateral and vertical directions against end plates 36 and 76, frame 14 is free to float to a small degree independently of carriage 40. Thus small fluctuations in the height of rails 12 when a rail-mounted machine is rolling on the rails with the rail clamps retracted, is accommodated as the guide wheels then may rise and fall following the undulations in rails 12 independent of the position of frame 14 bolted to the rail-mounted machine.

In the event that severe conditions result in moments being applied to the brake shoes as discussed above, the moment is also resisted by substantially vertical planar bearing surfaces 80a on laterally extending wings 80 extending laterally outwardly from the upper-most ends of clamping levers 62. In the event of a moment due to force in direction A being sufficient to cause a rotation of clamping levers 62 about brake shoes 34 one of the inner edges 82a of top support plates 82 act as a stop to bear against the corresponding bearing surfaces 80a of the clamping levers 62.

Access holes 84 are provided in webs 68b of I-beams 68. Holes 84 are aligned with ends 24a of the upper parallelogram linkages 24. Means are provided on the ends of the corresponding pins 25, such as male socket ends 25a, so that a workman may insert a socket wrench or other torquing device to apply a moment to parallelogram linkage arms 24. The workman may thereby manually retract clamping levers 62 and manually elevate carriage 40 so as to raise brake shoes 34 and the lower most ends of clamping levers 62 above rails 12.

Figure 17:
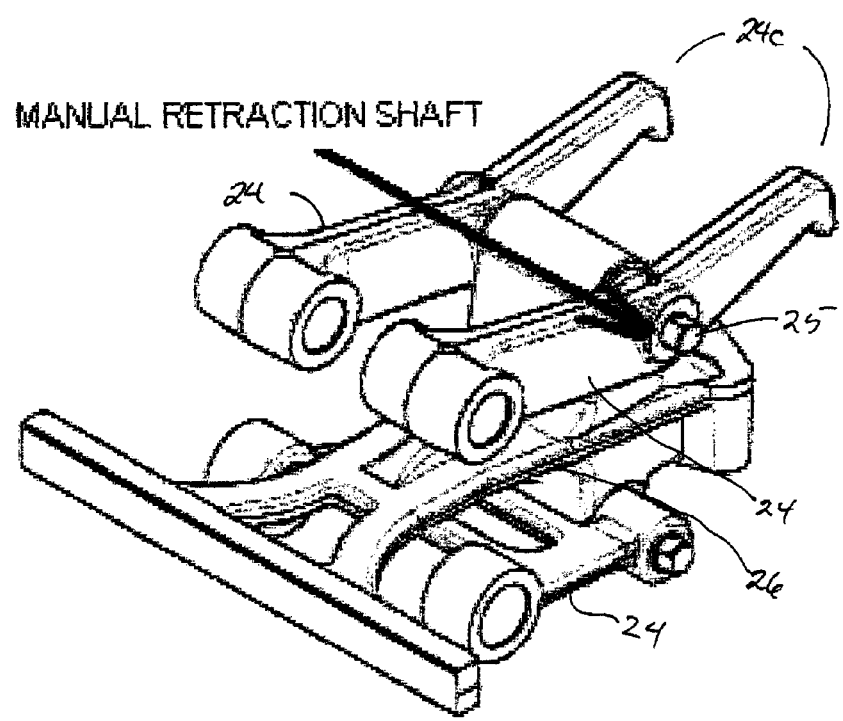
FIG. 17 is, in perspective view, the upper and lower suspension arms mounted onto a cantilevered arm.
Figure 18:
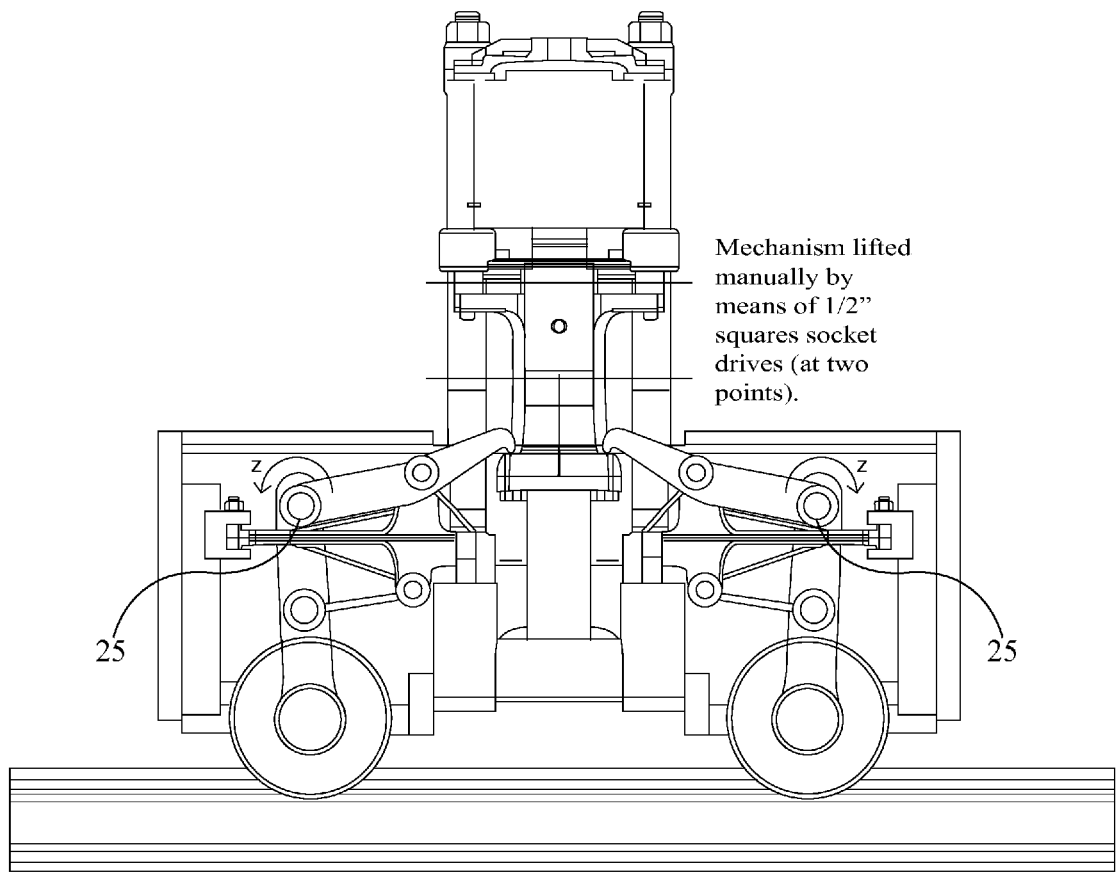
FIG. 18 is, in an alternative embodiment, the cross sectional view of FIG. 4d where the rail clamp has been released and the carriage manually elevated, the upper suspension arms not having extensions to engage the annular flange around the base of the cylinder.

In a further manual embodiment such as seen in FIGS. 17 and 18, arms 24 do not have cantilevered ends 24c and so consequently, carriage 40 may not be hydraulically elevated. Instead, carriage 40 is elevated by means of a socket drive, for example a ½ inch square socket, rotating arms 24 in direction Z by rotating male socket ends 25a. Access to male socket ends 25a is through holes 84 in I-beams 68.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A rail clamp comprising:
a carriage having a lower end and an opposite upper end, wherein said carriage has a rigid base mounted at said lower end and an actuator frame mounted to said base so as to extend upwardly from said base to said upper end,
at least one spring mounted in said actuator frame at said upper end of said carriage,
a selectively actuable actuator mounted between said base and said at least one spring, and actuable between a retracted position, a first extended position, and a fully extended position,
at least one guide wheel mounted on a wheel support so as to depend therefrom for rolling engagement along a rail,
at least one suspension frame pivotally mounted at a first end thereof to said carriage and pivotally mounted at an opposite second end thereof to said wheel support, said actuator operating on said first end of said suspension frame so as to elevate said carriage to a fully elevated position on said suspension frame as said actuator extends from said first extended position to said fully extended position,
a substantially vertically aligned, opposed facing pair of clamping levers pivotally mounted to said base of said carriage, wherein lower-most ends of said pair of clamping levers are adapted for mounting a corresponding opposed facing pair of brake shoes thereon, and said pair of clamping levers are pivotable relative to said base so as to clamp said lower-most ends together when opposite upper ends of said pair of clamping levers are moved apart,
a clamping lever retractor acting on said pair of clamping levers to move said lowermost ends of said pair of clamping levers apart to unclamp the rail when said actuator extends from said retracted position to said first extended position,
wherein said actuator when extending from said first extended position to said fully extended position so as to position said carriage in said fully elevated position, simultaneously elevates said lower-most ends of said pair of clamping levers above a substantially horizontal plane containing a lower-most surface of said at least one guide wheel so that brake shoes mounted on said lower-most ends of said pair of clamping levers are elevated above the rail when said at least on guide wheel is on the rail,
and wherein said actuator when retracting from said fully extended position to said first extended position, so as to position said carriage in a fully lowered position, simultaneously lowers said lower-most ends of said pair of clamping levers to bracket opposite sides of the rail when said at least on guide wheel is on the rail, and wherein said actuator when retracting from said first extended position to said retracted position operates on said upper ends of said pair of clamping levers to move said upper ends of said pair of clamping levers apart thereby clamping said lower most ends together onto the opposite sides of the rail.

2. The rail clamp of claim 1, further comprising a load transfer frame mountable at at least a first end thereof to a piece of rail-mounted machinery needing the braking assistance of said rail clamp, wherein said lower-most ends of said pair of clamping levers are disposed relative to said mounting frame so as to depend downwardly below said load transfer frame when said carriage is in said fully lowered position.

3. The rail clamp of claim 2, wherein said load transfer frame includes at least a longitudinally spaced apart pair of load transfer members sandwiching in sliding engagement therebetween said base of said carriage and lower ends of said pair of clamping levers.

4. The rail clamp of claim 3, wherein said load transfer frame includes longitudinally extending load transfer walls and wherein said pair of load transfer members are laterally extending members mounted to said load transfer walls.

5. The rail clamp of claim 4, wherein said base of said carriage includes a laterally extending substantially parallel elongate pair of base members sandwiching said lower ends of said pair of clamping lever therebetween.

6. The rail clamp of claim 5, wherein said pair of clamping levers are pivotally mounted to said pair of base members.

7. The rail clamp of claim 6, wherein said pair of base members are a pair of connector plates.

8. The rail clamp of claim 1, wherein said at least one suspension frame includes at least a pair of parallelogram linkages pivotally mounted to said carriage so as to maintain a substantially vertical trajectory for movement of said carriage relative to said at least one guide wheel.

9. The rail clamp of claim 8, wherein said wheel support includes a vertically extending member wherein upper and lower linkages of said pair of parallelogram linkages are pivotally mounted to corresponding upper and lower ends of said vertically extending member of said wheel support.

10. The rail clamp of claim 9, wherein said carriage includes suspension supports and wherein said pair of parallelogram linkages are mounted vertically spaced apart on said suspension supports.

11. The rail clamp of claim 10, further comprising a load transfer frame adapted for mounting at a first end thereof to a piece of rail-mounted machinery needing the braking assistance of said rail clamp, wherein said carriage and said pair of clamping levers are mounted for substantially vertical translation within said load transfer frame, and wherein said pair of clamping levers transfer loads applied substantially longitudinally to said load transfer frame to brake shoes mounted to said pair of clamping levers when clamped onto the rail, wherein said load is transferred by compression against said pair of clamping levers.

12. The rail clamp of claim 11, wherein said load transfer frame further includes lateral cross members bracketing said carriage.

13. The rail clamp of claim 12, wherein said base of said carriage includes a longitudinally spaced apart parallel pair of base members, and wherein said lateral cross members sandwich said pair of base members against said pair of clamping levers.

14. The rail clamp of claim 8, wherein said pair of parallelogram linkages include rigid extensions which engage against corresponding rigid surfaces on said actuator as said actuator is extended to said fully extended position whereby said at least one suspension frame is rotated upwardly therewith and carries said carriage upwardly with it.

15. The rail clamp of claim 1, wherein said actuator includes a piston actuating from a piston housing which bears against said upper ends of said pair of clamping levers, and wherein said piston housing is wedge shaped, wherein said housing bears against said upper ends of said pair of clamping levers so as to force said upper ends apart as said piston housing is lowered relative to said actuator frame and said base by a retraction of said piston into said piston housing as it is urged downwards by said at least one spring.

16. The rail clamp of claim 15, wherein elevation of said piston housing by actuation of said piston is against the return biasing force of said at least one spring, and wherein said clamping lever retractor is at least one resilient member urging said upper ends of said pair of clamping levers together as said piston housing is elevated.

17. The rail clamp of claim 1, wherein said lowermost ends of said pair of clamping levers are adapted for mounting said pair of brake shoes thereon by an aperture formed in lowermost end of each of said pair of clamping levers for accepting a fastener through each said aperture so as to releasably engage a corresponding said brake shoe against a corresponding said lower-most end of each clamping lever of said pair of clamping lever.

18. The rail clamp of claim 1, wherein said at least one suspension frame includes rigid extensions which engage against corresponding rigid surfaces on said actuator as said actuator is extended is extended to said fully extended position whereby said at least on suspension frame is rotated upwardly therewith and carries said carriage upwardly with it.

19. A rail clamp comprising:
   a carriage having a lower end and an opposite upper end, wherein said carriage has a rigid base mounted at said lower end and an actuator frame mounted to said base so as to extend upwardly from said base to said upper end,
   at least one spring mounted in said actuator frame at said upper end of said carriage,
   a selectively actuable actuator mounted between said base and said at least one spring, and actuable between a retracted position, a first extended position and a fully extended position,
   at least one guide wheel mounted on a wheel support so as to depend therefrom for rolling engagement along a rail,
   at least one suspension frame pivotally mounted at a first end thereof to said carriage and pivotally mounted at an opposite second end thereof to said wheel support, said at least one suspension frame elevated by a manual actuator mounted thereon, so that manual actuation by means of a manual torque applied to said manual actuator elevates said carriage by rotation of said at least one suspension frame,
   a substantially vertically aligned, opposed facing pair of clamping levers pivotally mounted to said base of said carriage, wherein lower-most ends of said pair of clamping levers are adapted for mounting a corresponding opposed facing pair of brake shoes thereon, and said pair of clamping levers are pivotable relative to said base so as to clamp said lower-most ends together when opposite upper ends of said pair of clamping levers are moved apart,
   a clamping lever retractor acting on said pair of clamping levers to move said lowermost ends of said pair of clamping levers apart to unclamp the rail when said actuator extends from said retracted position to said first extended position, wherein said actuator when extending from said first extended position to said fully extended position so as to position said carriage in said fully elevated position, simultaneously elevates said lower-most ends of said pair of clamping levers above a substantially horizontal plane containing a lower-most surface of said at least one guide wheel so that brake shoes mounted on said lower-most ends of said pair of clamping levers are elevated above the rail when said at least one guide wheel is on the rail, and wherein said actuator when retracting from said fully extended position to said first extended position, so as to position said carriage in a fully lowered position, simultaneously lowers said lower-most ends of said pair of clamping levers to bracket opposite sides of the rail when said at least one guide wheel is on the rail, and wherein said actuator when retracting from said first extended position to said retracted position operates on said upper ends of said pair of clamping levers to move said upper ends of said pair of clamping levers apart thereby clamping said lower most ends together onto the opposite sides of the rail.

20. The rail clamp of claim 19, wherein said manual actuator is mounted on at least one pivot joint of said at least one suspension frame.

* * * * *